(12) United States Patent
Kameda et al.

(10) Patent No.: US 9,240,587 B2
(45) Date of Patent: Jan. 19, 2016

(54) CARBON MATERIAL FOR NONAQUEOUS-ELECTROLYTE SECONDARY-BATTERY NEGATIVE ELECTRODE AND PROCESS FOR PRODUCING THE SAME, NEGATIVE ELECTRODE INCLUDING THE SAME FOR NONAQUEOUS SECONDARY BATTERY, AND NONAQUEOUS-ELECTROLYTE SECONDARY BATTERY

(71) Applicant: MITSUBISHI CHEMICAL CORPORATION, Chiyoda-ku (JP)

(72) Inventors: Takashi Kameda, Ibaraki (JP); Hideharu Sato, Tokyo (JP); Tomohiro Sato, Ibaraki (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 103 days.

(21) Appl. No.: 13/853,641

(22) Filed: Mar. 29, 2013

(65) Prior Publication Data

US 2013/0224598 A1    Aug. 29, 2013

Related U.S. Application Data

(63) Continuation of application No. PCT/JP2011/072255, filed on Sep. 28, 2011.

(30) Foreign Application Priority Data

Sep. 29, 2010    (JP) ................................. 2010-219365

(51) Int. Cl.
*H01M 4/133*    (2010.01)
*C01B 31/02*    (2006.01)
(Continued)

(52) U.S. Cl.
CPC ............... *H01M 4/133* (2013.01); *C01B 31/02* (2013.01); *H01M 4/587* (2013.01);
(Continued)

(58) Field of Classification Search
CPC ....................................................... H01M 4/133
USPC ........................................ 429/231.8; 428/402
See application file for complete search history.

(56) References Cited

U.S. PATENT DOCUMENTS 5,622,793 A    4/1997    Iijima et al.
5,851,697 A    12/1998    Iijima et al.
(Continued)

FOREIGN PATENT DOCUMENTS

CN    1261729 A    8/2000
CN    1559092 A    12/2004
(Continued)

OTHER PUBLICATIONS

International Search Report and Written Opinion of the International Searching Authority issued Dec. 20, 2011, in PCT/JP2011/072255 (with English-language translation).
(Continued)

*Primary Examiner* — Karie O'Neill Apicella
(74) *Attorney, Agent, or Firm* — Oblon, McClelland, Maier & Neustadt, L.L.P.

(57) ABSTRACT

A carbon material for nonaqueous-electrolyte secondary-battery negative electrode is provided, which satisfies the followings (1) and (2):
(1) the carbon material has an aspect ratio of 10 or less;
(2) the amount of CO eliminated from the carbon material during heating to 1,000° C., as determined with a temperature programmed decomposition mass spectrometer (TPD-MS), is 2-15 µmol/g.

20 Claims, 6 Drawing Sheets

(51) Int. Cl.
*H01M 4/587* (2010.01)
*H01M 10/0525* (2010.01)

(52) U.S. Cl.
CPC ...... *H01M 10/0525* (2013.01); *C01P 2002/72* (2013.01); *C01P 2002/82* (2013.01); *C01P 2004/32* (2013.01); *C01P 2006/11* (2013.01); *C01P 2006/12* (2013.01); *Y02E 60/122* (2013.01); *Y10T 428/2982* (2015.01)

(56) References Cited

U.S. PATENT DOCUMENTS

| | | | |
|---|---|---|---|
| 6,632,569 | B1 | 10/2003 | Kameda et al. |
| 2007/0048607 | A1* | 3/2007 | Nakashima et al. ......... 429/209 |
| 2010/0015514 | A1 | 1/2010 | Miyagi et al. |
| 2010/0021820 | A1 | 1/2010 | Ishii |
| 2011/0262802 | A1* | 10/2011 | Uono et al. .................. 429/188 |
| 2012/0052393 | A1 | 3/2012 | Kameda et al. |
| 2012/0064403 | A1 | 3/2012 | Kameda et al. |
| 2013/0022861 | A1 | 1/2013 | Miyagi et al. |
| 2015/0243936 | A1 | 8/2015 | Miyagi et al. |

FOREIGN PATENT DOCUMENTS

| | | |
|---|---|---|
| EP | 2 413 404 | 2/2012 |
| JP | 5-325967 | 12/1993 |
| JP | 9-320590 | 12/1997 |
| JP | 11-273676 | 10/1999 |
| JP | 2000-223120 A | 8/2000 |
| JP | 2000-223124 | 8/2000 |
| JP | 2000-306582 | 11/2000 |
| JP | 2003-171110 | 6/2003 |
| JP | 3534391 | 6/2004 |
| JP | 3677992 | 8/2005 |
| JP | 2007-180025 | 7/2007 |
| JP | 2010-165580 | 7/2010 |
| JP | 2011-198710 | 10/2011 |
| WO | WO 2008/084675 A1 | 7/2008 |
| WO | WO 2010/050595 A1 | 5/2010 |
| WO | WO 2010050595 A1 * | 5/2010 ............. H01M 4/58 |

OTHER PUBLICATIONS

Office Action issued Dec. 2, 2014 in Japanese Application No. 2011-212314 (with English language translation).

Combined Chinese Office Action and Search Report issued Nov. 15, 2014 in Patent Application No. 201180047471.2 (with English language translation and English translation).

Office Action issued Jun. 24, 2015, in corresponding Chinese Office Patent Application No. 201180047471.2 (with English-language Translation).

Supplementary European Search Report issued Sep. 9, 2015, in corresponding patent application No. EP 11 82 9219.

* cited by examiner

CARBON MATERIAL FOR NONAQUEOUS-ELECTROLYTE SECONDARY-BATTERY NEGATIVE ELECTRODE AND PROCESS FOR PRODUCING THE SAME, NEGATIVE ELECTRODE INCLUDING THE SAME FOR NONAQUEOUS SECONDARY BATTERY, AND NONAQUEOUS-ELECTROLYTE SECONDARY BATTERY

TECHNICAL FIELD

The present invention relates to a carbon material for non-aqueous-electrolyte secondary-battery negative electrode and a process for producing the carbon material. The invention further relates to a negative electrode for nonaqueous secondary battery which includes the carbon material and to a nonaqueous-electrolyte secondary battery which includes the negative electrode.

BACKGROUND ART

Nonaqueous lithium secondary batteries including a positive electrode and a negative electrode that were capable of occluding and releasing lithium ions and a nonaqueous electrolytic solution in which a lithium salt, e.g., $LiPF_6$ or $LiBF_4$, had been dissolved were developed, and are in practical use. Although various negative-electrode materials for use in these batteries have been proposed, use is being made of graphitic carbon materials such as natural graphites, artificial graphites obtained by graphitizing, for example, cokes, graphitized mesophase pitch, graphitized carbon fibers, etc., because of advantages thereof, such as a high capacity and excellent flatness of discharge potential.

Also used is amorphous carbon materials, for example, for the reason that the carbon materials are relatively stable to some electrolytic solutions. Furthermore, a carbon material which was obtained by causing amorphous carbon to cover or adhere to the surface of graphitic carbon particles and which has been thereby made to combine the properties of graphite and the properties of amorphous carbon is in use.

In patent document 1 is used a rounded graphitic carbon material which was obtained by subjecting graphitic carbon particles, which in themselves are flaky, scalelike, or platy, to a mechanical energy treatment to damage the surface of the graphitic particles and simultaneously make the particle shape spherical and which has been thereby made to attain improved high-rate charge/discharge characteristics. Furthermore, proposed therein is to use a multilayered rounded carbon material which was obtained by causing amorphous carbon to cover or adhere to the surface of the rounded graphitic carbon particles and which has been thereby made to combine the properties of both graphite and amorphous carbon and high-rate charge/discharge characteristics.

Patent document 2 discloses that a battery having excellent high-rate charge/discharge characteristics is obtained by using, as an electrode, a multilayered carbon material which was obtained by causing amorphous carbon to cover or adhere to the surface of graphitic carbon particles and in which the amount of CO eliminated therefrom during heating to 800° C., as determined with a temperature programmed decomposition mass spectrometer (TPD-MS), is $0.8 \times 10^{-6}$ mol/g to $30 \times 10^{-6}$ mol/g.

However, as a result of the recent development of applications of nonaqueous lithium secondary batteries, there is a desire for a nonaqueous-electrolyte secondary battery that combines high-rate charge/discharge characteristics and high cycle characteristics and that is for use in notebook type personal computers, mobile communication appliances, portable cameras, portable game machines, and the like, which are expected to have higher performances than before, and for use in power tools, electric vehicles, etc.

Meanwhile, although battery production includes the step of infiltrating an electrolytic solution into the electrodes disposed in a battery can, the prolonged time period required for the electrodes to absorb the electrolytic solution is a cause of an increase in production cost.

PRIOR-ART DOCUMENTS

Patent Documents

Patent Document 1: Japanese Patent No. 3534391
Patent Document 2: Japanese Patent No. 3677992

SUMMARY OF THE INVENTION

Problems that the Invention is to Solve

An investigation made by the present inventors revealed that although the technique described in patent document 1 is effective in heightening high-rate charge/discharge characteristics because of the spherical shape of the particles of the carbon material for electrodes and in reducing irreversible capacity by covering with amorphous carbon, thereby bringing about a further improvement in high-rate charge/discharge characteristics, this prior-art technique is unable to meet the desire for a negative-electrode material which is for use in recent high-performance appliances and which combines higher charge/discharge characteristics and high cycle characteristics.

In patent document 2 is proposed a negative-electrode material obtained by burning a mixture of a raw graphite and an organic substance in an oxidizing gas having a regulated oxygen concentration to thereby give a composite carbon material in which the amount of CO eliminated therefrom by heating is in a given range. As the raw graphite, a flaky graphite or scalelike graphite in which the particles have the shape of a thin flattened piece is used therein.

Because of this, when the negative-electrode material described in patent document 2 is applied to a current collector, e.g., a copper foil, and then pressed and densified in order to use the negative-electrode material as an electrode, the thin flattened particles of the negative-electrode material are undesirably arranged parallel to the current collector. As a result, the particles inhibit the movement of lithium ions, which need to move in the direction perpendicular to the current collector, resulting in a limit on high-rate charge/discharge characteristics. It has hence been difficult for the high-rate charge/discharge characteristics and the cycle characteristics to reach the levels required for use in recent high-performance appliances.

In addition, in the method described in patent document 2, in which oxygenic functional groups are introduced by burning in an oxygen-containing gas, it is necessary to thinly pack a raw powder in the burning vessel or use a rotary burning device, in order to evenly bring all particles of the raw material, which is a powder, into contact with the oxygen-containing gas. There has hence been a problem that this production process has poor production efficiency and, as a result, is expensive.

Accordingly, the present inventors propose a negative-electrode material which eliminates the problems described above and is for use in nonaqueous-electrolyte secondary batteries that are suitable not only for use in notebook type personal computers, mobile communication appliances, portable cameras, portable game machines, or the like, which are expected to have higher performances than before, but also for applications such as power tools, electric vehicles, etc., and that have a high capacity and combine high-rate charge/discharge characteristics and high cycle characteristics.

Meanwhile, the prolonged time period required for electrodes to absorb an electrolytic solution in a step for battery production has been a cause of an increase in production cost, and this problem remains unsolved.

Means for Solving the Problems

The present inventors diligently made investigations in order to overcome those problems. As a result, the inventors have found that the problems can be eliminated by subjecting a specific raw carbon material to a mechanical treatment, more preferably, by subjecting a multilayered raw carbon material obtained by covering a rounded graphite with amorphous carbon to a mechanical treatment to introduce oxygenic functional groups into the surface of the multilayered carbon material and using the resultant carbon material as an electrode for nonaqueous-electrolyte secondary batteries. Incidentally, the amount of the oxygenic functional groups can be determined in terms of the amount of CO eliminated during heating to 1,000° C., using a temperature programmed decomposition mass spectrometer (TPD-MS).

The invention is as follows.
1. A carbon material for nonaqueous-electrolyte secondary-battery negative electrode, which satisfies the followings (1) and (2):
(1) the carbon material has an aspect ratio of 10 or less;
(2) the amount of CO eliminated from the carbon material during heating to 1,000° C., as determined with a temperature programmed decomposition mass spectrometer (TPD-MS), is 2-15 µmol/g.
2. The carbon material for nonaqueous-electrolyte secondary-battery negative electrodes according to the item 1 above, which has a 002-plane interplanar spacing (d002), as determined by wide-angle X-ray diffractometry, of 0.337 nm or less.
3. The carbon material for nonaqueous-electrolyte secondary-battery negative electrodes according to the item 1 or 2 above, which has a specific surface area of 0.5-8 m$^2$/g.
4. The carbon material for nonaqueous-electrolyte secondary batteries according to any one of the items 1 to 3 above, which has an average degree of circularity, as determined with a flow type particle analyzer, of 0.9 or higher.
5. A negative electrode for nonaqueous secondary batteries which comprises a current collector and an active-material layer formed on the current collector, wherein the active-material layer contains the carbon material for nonaqueous-electrolyte secondary batteries according to any one of the items 1 to 4 above.
6. A lithium ion secondary battery which comprises: a positive electrode and a negative electrode that are capable of occluding and releasing lithium ions; and an electrolyte, wherein the negative electrode is the negative electrode for nonaqueous-electrolyte secondary batteries according to the item 5 above.
7. A process for producing a carbon material for nonaqueous-electrolyte secondary-battery negative electrodes, which comprises subjecting a raw carbon material to a mechanical treatment, wherein the raw carbon material has a 002-plane interplanar spacing (d002), as determined by wide-angle X-ray diffractometry, of 0.337 nm or less, a tap density of 0.8 g/cm$^3$ or higher and a value of Raman R of 0.2-0.5, in which the value of Raman R is the ratio of the intensity of a peak appearing around 1,360 cm$^{-1}$ to the intensity of a peak appearing around 1,580 cm$^{-1}$, in an argon ion laser Raman spectrum that has a value of Raman R.
8. The process for producing a carbon material for nonaqueous-electrolyte secondary-battery negative electrodes according to the item 7 above, wherein the mechanical treatment is a treatment in which an apparatus that includes a rotor which comprises a casing and a plurality of blades disposed inside the casing is used to treat the raw carbon material at a peripheral speed of the rotor of 50-300 in/sec.
9. The process for producing a carbon material for nonaqueous-electrolyte secondary-battery negative electrodes according to the item 7 or 8 above, wherein the raw carbon material is a multilayered raw carbon material which comprises a graphitic particle and amorphous carbon that covers the surface of the graphitic particle.

Effects of the Invention

Nonaqueous-electrolyte secondary batteries in which the carbon material for nonaqueous-electrolyte secondary-battery negative electrodes of the invention is used as an electrode show excellent properties and combine high-rate charge/discharge characteristics and high cycle characteristics. By using the carbon material for nonaqueous-electrolyte secondary-battery negative electrodes of the invention as an electrode of a nonaqueous-electrolyte secondary battery, the time period required for the electrolytic solution to be absorbed is shortened, making it possible to attain a reduction in battery production cost.

MODES FOR CARRYING OUT THE INVENTION

Figure 1:
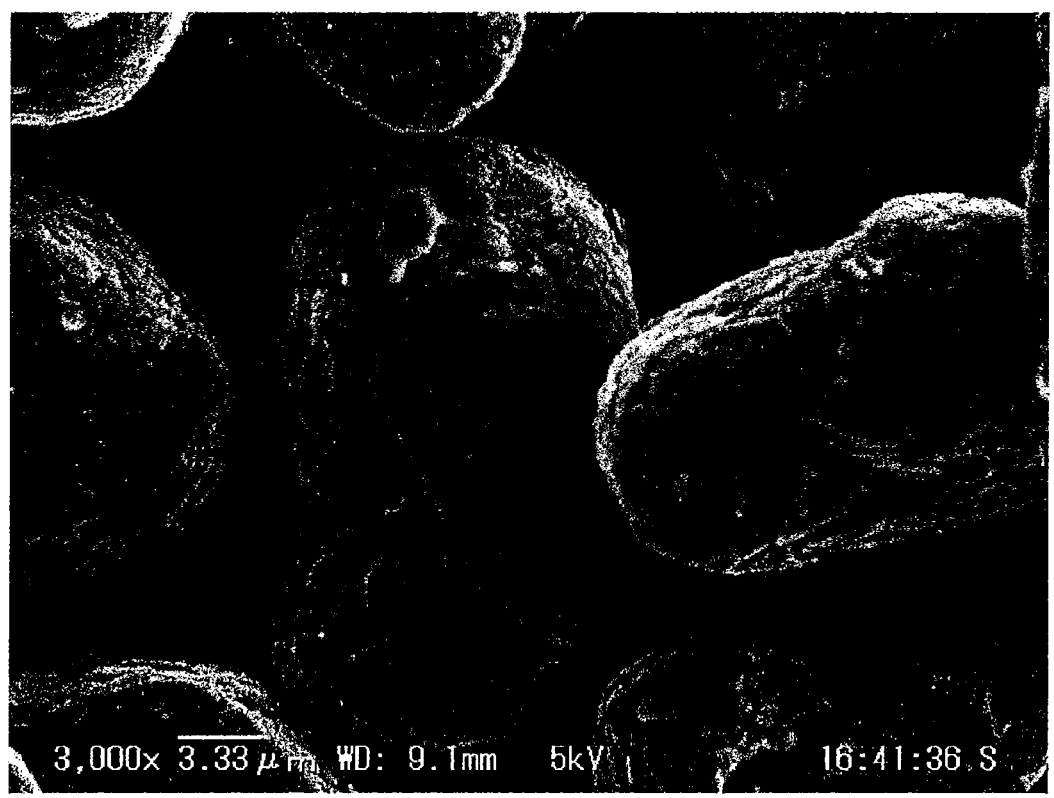
FIG. 1 is an electron photomicrograph of the carbon material for negative electrodes obtained in Example 1.

The carbon material for nonaqueous-electrolyte secondary-battery negative electrodes according to the invention (referred to also as "carbon material" in this description) satisfies the following (1) and (2):

(1) the carbon material has an aspect ratio of 10 or less;

(2) the amount of CO eliminated from the carbon material during heating to 1,000° C., as determined with a temperature programmed decomposition mass spectrometer (TPD-MS), is 2-15 µmol/g.

<Kind of the Carbon Material for Nonaqueous-Electrolyte Secondary-Battery Negative Electrodes>

It is preferred that the carbon material of the invention should be one or more materials selected from natural graphites, artificial graphites, and graphites with an amorphous coating. Any desired two or more of these carbon materials can be advantageously used in combination in any desired proportion as the carbon material. A mixture of one or more thereof with one or more other carbon materials may be used as the carbon material. More preferred of these materials is the carbon material described above which has a multilayer structure (hereinafter referred to also as "multilayered carbon material").

<Properties of the Carbon Material for Nonaqueous-Electrolyte Secondary-Battery Negative Electrodes>

Representative properties of the carbon material for nonaqueous-electrolyte secondary-battery negative electrodes of the invention are described below.

(a) 002-Plane Interplanar Spacing (d002)

The carbon material for nonaqueous-electrolyte secondary-battery negative electrodes has a 002-plane interplanar spacing (d002), as determined by wide-angle X-ray diffractometry, of generally 0.337 nm or less. Too large values of d002 mean that the carbon material has low crystallinity, and there are cases where an increase in initial irreversible capacity results. Meanwhile, since a theoretical value of the 002-plane interplanar spacing of graphites is 0.335 nm, it is usually preferred that the d002 of the carbon material should be 0.335 nm or larger. The Lc thereof is usually preferably 90 nm or larger, more preferably 95 nm or larger. The 002-plane interplanar spacing (d002) by wide-angle X-ray diffractometry is determined by the method which will be described later in Examples.

In case where the carbon material has too large a value of 002-plane interplanar spacing (d002) determined by wide-angle X-ray diffractometry, this tends to indicate that most of the multilayered carbon material particles other than the surface thereof have low crystallinity. This carbon material tends to cause a decrease in capacity due to a large irreversible capacity as in the case of amorphous carbon materials. Meanwhile, too small values of Lc indicate that this carbon material has reduced crystallinity, and this carbon material also tends to cause a decrease in capacity due to an increase in irreversible capacity.

(b) Tap Density

The carbon material for nonaqueous-electrolyte secondary-battery negative electrodes has a tap density of usually preferably 0.8 g/cm$^3$ or higher, more preferably 0.85 g/cm$^3$ or higher. The tap density thereof is usually preferably 1.5 g/cm$^3$ or less. Tap density is measured by the method which will be described later in Examples. In case where the carbon material for nonaqueous-electrolyte secondary-battery negative electrodes has too low a tap density, this carbon material tends not to be sufficiently spherical particles. There is hence a tendency that interconnected pores are not sufficiently ensured in the electrode and the Li ions in the electrolytic solution held in the pores show reduced movability, resulting in a decrease in high-rate charge/discharge characteristics.

(c) Aspect Ratio

The carbon material for nonaqueous-electrolyte secondary-battery negative electrodes has an aspect ratio of generally 10 or less, preferably 7 or less, more preferably 5 or less, even more preferably 3 or less. Furthermore, since the minimum value of aspect ratio is 1 in theory, the aspect ratio of the carbon material is usually preferably 1 or greater. Too large values of the aspect ratio mean that the particles are not spherical but have a shape which is more akin to the shape of a thin flattened piece or a flake. When this carbon material is used to form an electrode, the particles tend to be arranged parallel to the current collector pair. There is hence a tendency that interconnected pores extending in the direction of the thickness of the electrode are not sufficiently ensured and the thickness-direction movability of Li ions decreases, resulting in a decrease in high-rate charge/discharge characteristics.

A measurement of aspect ratio in the invention is made in the following manner. A binder is added to the carbon material for electrodes to prepare a slurry, and this slurry is applied to a metal foil and then dried to obtain a coated type electrode. Subsequently, this coated type electrode is cut along a direction perpendicular to the coated surface, and a photograph of the resultant cut surface is taken with an electron microscope. With respect to 50 particles in an area selected at will, the lengths of the longest axis a (μm) and of the shortest axis b (μm) of the section of each particle are measured to determine a/b. The average of the values of a/b for the 50 particles is taken as the aspect ratio.

(d) Amount of CO Eliminated during Heating to 1,000° C., with Temperature Programmed Decomposition Mass Spectrometer (TPD-MS)

The amount of CO eliminated from the carbon material for nonaqueous-electrolyte secondary-battery negative electrodes during heating to 1,000° C., as measured with a temperature programmed decomposition mass spectrometer (TPD-MS), is 2 μmol/g or more, preferably 2.3 μmol/g or more, more preferably 3.4 μmol/g or more, even more preferably 5.1 μmol/g or more, and is preferably 15 μmol/g or less, more preferably 10 μmol/g or less.

In case where the amount of eliminated CO is too small, the amount of oxygenic functional groups imparted to the particles is small and, as a result, this carbon material tends to have a low affinity for electrolytic solutions. The resultant battery hence tends to be low in high-rate charge characteristics and cycle characteristics. In case where the amount of eliminated CO is too large, this means that the mechanical treatment was too intense. Consequently, the amount of oxygenic functional groups has increased and, simultaneously therewith, the particles have undergone excess crushing and size reduction, resulting in an increase in specific surface area. Use of this carbon material as an electrode tends to cause an increase in irreversible capacity.

That the amount of CO eliminated from the carbon material during heating to 1,000° C., as measured with a temperature programmed decomposition mass spectrometer (TPD-MS), has been regulated to a value within that range means that oxygenic functional groups have been imparted to the surface of the multilayered carbon material. Due to the presence of these oxygenic functional groups, this carbon material has an enhanced affinity for electrolytic solutions which are polar solvents. When this carbon material is used as an electrode, the electrolytic solution is more apt to infiltrate into and be retained by the electrode. This negative electrode is hence suitable for use in nonaqueous-electrolyte secondary batteries which combine high-rate charge/discharge characteristics and cycle characteristics.

(e) Raman R Value

The carbon material for nonaqueous-electrolyte secondary-battery negative electrodes gives an argon ion laser Raman spectrum that has a value of Raman R, which is the ratio of the intensity of a peak appearing around 1,360 cm$^{-1}$ to the intensity of a peak appearing around 1,580 cm$^{-1}$, of generally 0.25 or larger, preferably 0.3 or larger. The Raman R value thereof is usually desirably 0.5 or less, preferably 0.4 or less. Raman R value is determined by the method which will be described later in Examples.

In case where the Raman R value thereof is too small, impaired high-rate charge/discharge characteristics tend to result. In case where the Raman R value of the carbon material is too large, this indicates that the amount of the amorphous carbon which covers the graphitic particles is large. In this case, the irreversible capacity possessed by the amorphous carbon amount is high and exerts a greater influence, and this tends to result in a decrease in battery capacity.

(f) Specific Surface Area by BET Method

The carbon material for nonaqueous-electrolyte secondary-battery negative electrodes has a specific surface area, as determined by the BET method, of usually preferably 0.5 $m^2/g$ or larger, more preferably 1 $m^2/g$ or larger, even more preferably 1.5 $m^2/g$ or larger, especially preferably 3 $m^2/g$ or larger. The specific surface area thereof is usually preferably 8 $m^2/g$ or less, more preferably 7 $m^2/g$ or less, even more preferably 6 $m^2/g$ or less. The specific surface area by the BET method is determined by the method according to the Examples which will be described later.

In case where the carbon material has too small a specific surface area, the acceptability of Li ions tends to be poor. In case where the specific surface area thereof is too large, there is a tendency that it is difficult to prevent a decrease in battery capacity due to the increase in irreversible capacity.

(g) Average Particle Diameter

The carbon material for nonaqueous-electrolyte secondary-battery negative electrodes has an average particle diameter (d50) which is usually preferably 2 μm or larger, more preferably 4 μm or larger, even more preferably 6 μm or larger, and is usually preferably 50 μm or less, more preferably 40 μm or less, even more preferably 35 μm or less. Average particle diameter is determined by the method according to the Examples which will be described later.

In case where the carbon material has too small an average particle diameter, there is a tendency that it is difficult to prevent an increase in irreversible capacity due to the increase in specific surface area. In case where the carbon material has too large a specific surface area, there is a tendency that it is difficult to prevent a decrease in high-rate charge/discharge characteristics due to the decrease in the area of contact between the electrolytic solution and the carbon material particles.

(h) Average Degree of Circularity

The carbon material for nonaqueous-electrolyte secondary-battery negative electrodes has an average degree of circularity of generally 0.88 or higher, preferably 0.89 or higher, more preferably 0.9 or higher, even more preferably 0.93 or higher. Since the maximum value of the average degree of circularity is 1 in theory, the average degree of circularity of the carbon material is generally 1 or less. Although more preferred embodiments include a multilayered carbon material which includes graphitic particles and amorphous carbon that covers the surface of the particles, it is preferred in this case that the uncovered graphitic particles should be rounded graphitic particles. By regulating the average degree of circularity of the uncovered graphitic particles to generally 0.88 or higher, preferably 0.89 or higher, more preferably 0.9 or higher, even more preferably 0.93 or higher, a carbon material which combines a high capacity and high-rate discharge characteristics can be obtained.

The average degree of circularity is determined with a flow type particle analyzer which is capable of photographing, using a CCD camera, each of thousand of particles dispersed in a liquid and of calculating an average shape parameter thereof. Particles in the range of 1.5-40 μm are examined with the analyzer to determine the average degree of circularity by the method according to the Examples which will be described later. The average degree of circularity is expressed in terms of the ratio of the peripheral length of a circle equivalent in area to the particle, as numerator, to the peripheral length of the projected particle image obtained by photographing, as denominator. The closer the particle image to a complete circle, the more the degree of circularity approaches 1. The more the particle image is slender or rugged, the smaller the value thereof.

(i) Number-Based Content of Fine Powder of 3 μm or Smaller

The carbon material for nonaqueous-electrolyte secondary-battery negative electrodes has a number-based content of fine powder of 3 μm or smaller, as determined with a flow type particle analyzer, which is usually preferably 13% or higher, more preferably 15% or higher, and is usually preferably 80% or less, more preferably 75% or less, even more preferably 70% or less, especially preferably 65% or less.

Fine powder generates through a mechanical treatment. Since fine powder has a small particle diameter, the fine particles come into contact with an electrolytic solution in an increased area and hence are apt to retain the electrolytic solution. As a result, the electrode can be prevented from suffering electrolytic-solution depletion during charge/discharge, and the battery tends to have satisfactory rate characteristics and satisfactory cycle characteristics. However, fine powder has a large surface deposition amount because of the small particle diameter. Consequently, too large an amount of fine powder tends to cause an increase in irreversible capacity.

(j) O/C Value

The carbon material for nonaqueous-electrolyte secondary-battery negative electrodes, when examined by X-ray photoelectron spectroscopy (XPS), has the following value of O/C, which is the ratio of the concentration of O atoms determined from the area of the spectral peak assigned to O1s to the concentration of C atoms determined from the area of the spectral peak assigned to C1s. The lower limit thereof is usually preferably 1.3% or higher, more preferably 1.4% or higher, even more preferably 1.5% or higher, especially preferably 1.6% or higher. The upper limit thereof is usually preferably 10% or less, more preferably 8% or less, even more preferably 6% or less, especially preferably 5%.

In case where the value of O/C is too small, the amount of oxygenic functional groups imparted to the particles is small and, as a result, this carbon material tends to have a low affinity for electrolytic solutions. The resultant battery hence tends to be low in high-rate charge characteristics and cycle characteristics. In case where the value of O/C is too large, this means that the mechanical treatment was too intense. Consequently, the amount of oxygenic functional groups has increased and, simultaneously therewith, the particles have undergone excess crushing and size reduction, resulting in an increase in specific surface area. Use of this carbon material as an electrode tends to cause an increase in irreversible capacity.

<Process for Producing the Carbon Material for Nonaqueous-Electrolyte Secondary-Battery Negative Electrode>

The carbon material for nonaqueous-electrolyte secondary-battery negative electrodes may be produced by any process without particular limitations, so long as the carbon material satisfies the requirements that the carbon material should have an aspect ratio of 10 or less and that the amount of CO eliminated from the carbon material during heating to 1,000° C., as determined with a temperature programmed decomposition mass spectrometer (TPD-MS), should be 2-15 μmol/g.

For example, a raw carbon material (a raw material which becomes the carbon material of the invention) that has a 002-plane interplanar spacing (d002), as determined by wide-angle X-ray diffractometry, of 0.337 nm or less and a tap density of 0.8 g/cm$^3$ or higher and that gives an argon ion laser Raman spectrum having a value of Raman R, which is the ratio of the intensity of a peak appearing around 1,360 cm$^{-1}$ to the intensity of a peak appearing around 1,580 cm$^{-1}$, of 0.2-0.5 is subjected to a mechanical treatment. Thus, a carbon material for nonaqueous-electrolyte secondary-battery negative electrodes which has the properties described above can be obtained.

In the section <Process for Producing the Carbon Material for Nonaqueous-Electrolyte Secondary-Battery Negative Electrode>, the raw material to be subjected to a mechanical treatment and the material which has undergone the mechanical treatment are suitably distinguished and referred to as a raw carbon material and a carbon material, respectively.

The 002-plane interplanar spacing (d002) of the raw carbon material, as determined by wide-angle X-ray diffractometry, is generally 0.337 nm or less. It is generally preferred that the d002 thereof should be 0.335 nm or larger. The Lc thereof is usually preferably 90 nm or larger, more preferably 95 nm or larger. The 002-plane interplanar spacing (d002) of a raw carbon material, by wide-angle X-ray diffractometry, is determined by the method which will be described later in Examples. When the value of d002 is too large, there are cases where the resultant carbon material has reduced crystallinity, resulting in an increase in initial irreversible capacity.

The tap density of the raw carbon material is generally 0.8 g/cm$^3$ or higher, preferably 0.85 g/cm$^3$ or higher. Tap density is determined by the method which will be described later in Examples. In case where the raw carbon material has too low a tap density, this raw carbon material tends not to be sufficiently spherical particles and the resultant carbon material for nonaqueous-electrolyte secondary-battery negative electrodes also has the same tendency. There is hence a tendency that interconnected pores are not sufficiently ensured in the electrode and the Li ions in the electrolytic solution held in the pores show reduced movability, resulting in a decrease in high-rate charge/discharge characteristics.

The Raman R value of the raw carbon material is generally 0.2-0.5. The Raman R value of a raw carbon material is determined by the method which will be described later in Examples. In case where the raw carbon material has too small a Raman R value, impaired high-rate charge/discharge characteristics tend to result.

In a preferred embodiment of processes for producing the carbon material for nonaqueous-electrolyte secondary-battery negative electrodes, a multilayered raw carbon material is subjected to a mechanical treatment, the multilayered raw carbon material being a raw material which includes a graphitic particle and amorphous carbon that covers the surface of the graphitic particle and which has a 002-plane interplanar spacing (d002), as determined by wide-angle X-ray diffractometry, of 0.337 nm or less and a tap density of 0.8 g/cm$^3$ or higher and gives an argon ion laser Raman spectrum having a value of Raman R, which is the ratio of the intensity of a peak appearing around 1,360 cm$^{-1}$ to the intensity of a peak appearing around 1,580 cm$^{-1}$, of 0.2-0.5. A process for producing the multilayered raw carbon material is described below in detail.

A preferred process for producing the multilayered raw carbon material is the production process described in Japanese Patent No. 3534391. Examples of graphitic particle to be used as a raw material for the multilayered raw carbon material include rounded graphite particle produced by subjecting, to a mechanical energy treatment, either a naturally occurring graphite in a flaky, scalelike, platy, or massive form or an artificial graphite produced by heating petroleum coke, coal pitch coke, coal needle coke, mesophase pitch, or the like to 2,500° C. or higher together with a graphitization catalyst optionally added thereto, e.g., SiC, iron, or boron.

The mechanical energy treatment, for example, is a treatment in which an apparatus including a rotor that includes a casing and a plurality of blades disposed inside the casing is used and the rotor is rotated at a high speed to thereby repeatedly exert mechanical actions, e.g., impact compression, friction, and shear force, on the natural graphite or artificial graphite introduced into the rotor. By subjecting the natural graphite or artificial graphite to the mechanical energy treatment, rounded graphitic particles to be used as a raw material can be produced.

Specifically, by subjecting the natural graphite or artificial graphite to the mechanical energy treatment, the flat graphitic particles are rounded while being bent, wound, or beveled and, simultaneously therewith, fine cracks, deficiencies, structural defects, and the like are formed in the surface of the particles. Thus, rounded graphitic particles can be produced.

Representative properties of the graphitic particle to be used as a raw material for the multilayered raw carbon material to be subjected to a mechanical treatment are described below. The graphitic particle give an argon ion laser Raman spectrum that has a value of Raman R, which is the ratio of the intensity of a peak appearing around 1,360 cm$^{-1}$ to the intensity of a peak appearing around 1,580 cm$^{-1}$, of usually preferably 0.2 or larger. The Raman R value thereof is usually preferably 0.5 or less, more preferably 0.4 or less. Raman R value is determined by the method which will be described later in Examples.

In case where the Raman R value of the graphitic particles is too small, impaired high-rate charge/discharge characteristics tend to result. In case where the Raman R value of the graphitic particles is too large, this indicates that the amount of the amorphous carbon which covers the graphitic particles is large. In this case, the irreversible capacity possessed by the amorphous carbon amount is high and exerts a greater influence, and this tends to result in a decrease in battery capacity.

It is generally preferred that the graphitic particles should have a 002-plane interplanar spacing (d002), as determined by wide-angle X-ray diffractometry, of 0.337 nm or less. Meanwhile, since a theoretical value of the 002-plane interplanar spacing of graphites is 0.335 nm, the d002 of the graphitic particles is generally 0.335 nm or larger. The Lc thereof is usually preferably 90 nm or larger, more preferably 95 nm or larger. The 002-plane interplanar spacing (d002) by wide-angle X-ray diffractometry is determined by the method which will be described later in Examples.

In case where the graphitic particles have too large a value of d002, these graphitic particles have low crystallinity and there are cases where an increase in initial irreversible capacity results. Furthermore, too large values of the 002-plane interplanar spacing (d002) indicate that the graphitic particles have not become a material having sufficient crystallinity. There is hence a tendency that the increased irreversible capacity results in a decrease in capacity. Meanwhile, too small values of Lc mean that the graphitic particles have low crystallinity, and these graphitic particles also tend to cause an increase in irreversible capacity and hence a decrease in capacity.

The graphitic particles have an aspect ratio of usually preferably 10 or less, more preferably 7 or less, even more preferably 5 or less, especially preferably 3 or less. Furthermore, since the minimum value of aspect ratio is 1 in theory, the aspect ratio of the graphitic particles is usually preferably 1 or greater.

Too large values of the aspect ratio of the graphitic particles mean that the particles are not spherical but have a shape which is more akin to the shape of a thin flattened piece or a flake. When a carbon material obtained therefrom is used to form an electrode, the particles tend to be arranged parallel to the current collector pair. There is hence a tendency that interconnected pores extending in the direction of the thickness of the electrode are not sufficiently ensured and the thickness-direction movability of Li ions decreases, resulting in a decrease in high-rate charge/discharge characteristics. For example, a carbon material in a flaky form has an aspect ratio greater than 10. Aspect ratio is measured in accordance with the method described above.

The graphitic particles have a tap density of usually preferably 0.8 g/cm$^3$ or higher, more preferably 0.85 g/cm$^3$ or higher. The tap density of graphitic particles is measured by the method which will be described later in Examples. In case where the graphitic particles have too low a tap density, these graphitic particles, which are a raw material for the raw carbon material for nonaqueous-electrolyte secondary-battery negative electrodes, tend not to be sufficiently spherical particles and the resultant carbon material for nonaqueous-electrolyte secondary-battery negative electrodes also has the same tendency. There is hence a tendency that interconnected pores are not sufficiently ensured in the electrode and the Li ions in the electrolytic solution held in the pores show reduced movability, resulting in a decrease in high-rate charge/discharge characteristics. As in the statement concerning aspect ratio given above, graphitic particles having a tap density of 0.8 g/cm$^3$ or higher can be defined as graphitic particles which have been rounded by a mechanical energy treatment.

Furthermore, by using the graphitic particles described above as a raw material and covering the surface of the graphitic particles with amorphous carbon, a multilayered raw carbon material can be produced.

It is preferred that the multilayered raw carbon material should be an amorphous-carbon-covered graphite obtained by mixing the graphitic particles with petroleum- or coal-derived tar or pitch or with a resin, e.g., poly(vinyl alcohol), polyacrylonitrile, phenolic resin, or cellulose, optionally using a solvent or the like and burning the mixture in a non-oxidizing atmosphere at a temperature which is generally 500° C. or higher, preferably 700° C. or higher, more preferably 800° C. or higher, and is generally 2,500° C. or lower, preferably 2,000° C. or lower, more preferably 1,500° C. or lower. There are cases where pulverization and classification are conducted after the burning according to need.

The coverage of the graphitic particles with amorphous carbon is usually preferably 0.1% or higher, more preferably 0.2% or higher, even more preferably 0.4% or higher, and is usually preferably 20% or less, more preferably 15% or less, even more preferably 10% or less. Coverage is determined by the method which will be described later in Examples.

In case where the coverage of the graphitic particles with amorphous carbon is too low, there is a tendency that the high acceptability of Li ions by amorphous carbon cannot be sufficiently utilized, making it difficult to obtain satisfactory high-rate charge characteristics. In case where the coverage thereof is too high, it tends to be difficult to prevent a decrease in capacity due to the greater influence of an increased irreversible capacity possessed by the amorphous carbon amount.

The carbon material of the invention is produced by subjecting a raw carbon material to a mechanical treatment. However, an efficient method for producing the effects of the invention is to produce the carbon material of the invention by subjecting a multilayered raw carbon material produced by the production method described above to a mechanical treatment.

The mechanical treatment, for example, is a treatment in which an apparatus including a rotor that includes a casing and a plurality of blades disposed inside the casing is used and the rotor is rotated at a high speed to thereby exert a mechanical action, e.g., friction, grinding, or impact, on the raw carbon material, preferably, the burned multilayered raw carbon material, introduced into the casing. Thus, the carbon material of the invention can be produced.

Due to the mechanical action, a mechanochemical action is exerted on the surface amorphous carbon of the multilayered raw carbon material, and oxygen in the air reacts with the surface amorphous carbon of the multilayered raw carbon material to impart oxygenic functional groups. Examples of the oxygenic functional groups to be imparted include —OH (phenolic hydroxyl group), —COOH (carboxyl group), —CO (carbonyl group), and =O (quinone-type oxygenic group or pyran-type oxygenic group).

The mechanical treatment to be conducted here preferably is not a treatment in which the raw material is repeatedly treated as in the mechanical energy treatment but a treatment in which the raw material is passed through the apparatus only once. In case where this mechanical treatment is conducted repeatedly, the particles suffer damage and there is a tendency that the particles are deformed considerably or are excessively pulverized to have too small a particle diameter.

Especially undesirable is to conduct a treatment using an apparatus of the type in which a raw carbon material is placed in a closed type vessel together with balls or rods and treated therein for a given time period. In case where the raw material is treated by this method, the particles are deformed and, even when spherical graphitic particles which have undergone a rounding treatment are used, the particles come to have a cabbage-like open shape. There are hence cases where the resultant carbon material causes an increase in irreversible capacity or a decrease in high-rate discharge characteristics or cycle characteristics.

Furthermore, when the treatment period in the method is prolonged, the pulverization proceeds excessively, resulting in too small a particle diameter. The carbon material having too small a particle diameter tends to have a considerably increased specific surface area, and use of this carbon material as an electrode of a nonaqueous-electrolyte secondary battery tends to cause a further increase in irreversible capacity. In addition, since the amount of functional groups imparted to the surface increases simultaneously, the amount of CO eliminated during heating to 1,000° C., as determined with a temperature programmed decomposition mass spectrometer (TPD-MS), tends to be a large value.

Specific examples of the apparatus for conducting the mechanical treatment include ACM Pulperizer, Inomizer, impeller mills, Turbo Mill, hammer mills, Fine Mill, Zepros, and hybridizers.

Conditions for the mechanical treatment are as follows. The peripheral speed of the rotor equipped with blades is usually preferably 50 m/sec or higher, more preferably 55 m/sec or higher, even more preferably 60 m/sec or higher. The peripheral speed thereof is usually preferably 300 m/sec or less, more preferably 200 m/sec or less.

In case where the peripheral speed of the rotor is too low, the mechanical effect on the surface of the multilayered carbon material tends to be insufficient and there is a tendency that the amount of functional groups imparted to the surface of the multilayered carbon material is insufficient, resulting in poor rate characteristics and/or poor cycle characteristics.

Furthermore, in case where the peripheral speed of the rotor is too high, the particles suffer damage and there is a tendency that the particles are deformed considerably or are excessively pulverized to have too small a particle diameter. In case where pulverization proceeds excessively and the particle diameter becomes too small, the resultant carbon material tends to have a considerably increased specific surface area. Use of this carbon material as an electrode of a nonaqueous-electrolyte secondary battery tends to cause an increase in irreversible capacity.

Usually, the treatment rate at which the raw carbon material is mechanically treated is not particularly limited. However, the lower limit thereof is usually preferably 1 kg/hr or higher, more preferably 5 kg/hr or higher. In case where the treatment rate is too low, there is a tendency that the production efficiency is low, resulting in an increase in production cost. With respect to the upper limit thereof, the limit depends on the treating ability of the apparatus for performing the mechanical treatment. However, in case where the concentration of particles in the casing is too high, the concentration of air, i.e., the concentration of oxygen in the air, is too low and this tends to result in insufficient impartation of functional groups.

The proportion of the volume occupied by the raw carbon material within the casing to the internal volume of the casing is usually preferably 5% or higher, more preferably 10% or higher, and the upper limit thereof is particularly 80% or less, more preferably 70% or less, even more preferably 60% or less.

In case where the proportion of the volume occupied by the raw carbon material within the casing to the internal volume of the casing is too low, the particles suffer damage and there is a tendency that the particles are deformed considerably or are excessively pulverized to have too small a particle diameter. In case where pulverization proceeds excessively and the particle diameter becomes too small, the multilayered carbon tends to have a considerably increased specific surface area. Use of this carbon material as an electrode of a nonaqueous-electrolyte secondary battery tends to cause an increase in irreversible capacity.

In case where the proportion of the volume occupied by the raw carbon material within the casing to the internal volume of the casing is too high, the amount of the air present in the casing, i.e., the amount of the oxygen present in the air, is insufficient, resulting in a tendency that functional groups are imparted to the carbon material in a reduced amount. Namely, the battery performance which is to be attained by the invention tends not to be obtained.

<Negative Electrode for Nonaqueous-Electrolyte Secondary Battery>

For producing a negative electrode using the carbon material for nonaqueous-electrolyte secondary-battery negative electrodes (hereinafter referred to also as negative-electrode material) of the invention, use may be made of a method in which a mixture of the negative-electrode material and a binding resin is slurried with an aqueous or organic medium and this slurry is applied, optionally after addition of a thickener thereto, to a current collector and dried. It is preferred that the binding resin to be used should be a binding resin which is stable to the nonaqueous electrolytic solution and is water-insoluble.

Examples of the binding resin include: rubbery polymers such as styrene, butadiene rubbers, isoprene rubbers, and ethylene/propylene rubbers; synthetic resins such as polyethylene, polypropylene, poly(ethylene terephthalate), and aromatic polyamides; thermoplastic elastomers such as styrene/butadiene/styrene block copolymers or products of hydrogenation thereof, styrene/ethylene/butadiene/styrene copolymers, and styrene/isoprene, styrene block copolymers or products of hydrogenation thereof; flexible resinous polymers such as syndiotactic 1,2-polybutadiene, ethylene/vinyl acetate copolymers, and copolymers of ethylene and an α-olefin having 3-12 carbon atoms; and fluoropolymers such as polytetrafluoroethylene/ethylene copolymers, poly(vinylidene fluoride), polypentafluoropropylene, and polyhexafluoropropylene.

Examples of the organic medium include N-methylpyrrolidone or dimethylformamide.

The amount of the binding resin to be incorporated per 100 parts by weight of the negative-electrode material is usually preferably 0.1 part by weight or more, more preferably 0.2 parts by weight or more. In case where the proportion of the binding resin to the negative-electrode material is too small, the binding force between particles of the negative-electrode material or between the negative-electrode material and the current collector is weak and the negative-electrode material may peel off the negative electrode, resulting in a decrease in battery capacity and a deterioration in cycle characteristics.

Conversely, in case where the proportion of the binding resin is too large, this arouses problems, for example, that the negative electrode has a reduced capacity and that lithium ions are inhibited from going in and out of the negative-electrode material. It is therefore preferred that the amount of the binding resin per 100 parts by weight of the negative-electrode material should be up to 10 parts by weight at the most, and it is preferred to use the binding resin usually in an amount of 7 parts by weight or less.

As the thickener to be added to the slurry, use may be made of a water-soluble cellulose derivative, such as carboxymethyl cellulose, methyl cellulose, hydroxyethyl cellulose, or hydroxypropyl cellulose, poly(vinyl alcohol), polyethylene glycol, or the like. Preferred of these is carboxymethyl cellulose. The amount of the thickener to be incorporated per 100 parts by weight of the negative-electrode material is usually preferably 0.1-10 parts by weight, more preferably 0.2-7 parts by weight.

As the negative current collector, use may be made of a material which has conventionally been known to be usable in this application, such as copper, a copper alloy, stainless steel, nickel, titanium, or carbon. The current collector usually is in the shape of a sheet. It is also preferred to use a current collector in which the surface has recesses and protrusions or to use a net, punching metal, or the like.

It is preferred that after the slurry containing the negative-electrode material and a binding resin is applied to a current collector and dried, the coated current collector should be pressed to heighten the density of the electrode formed on the current collector and to thereby increase the battery capacity per unit volume of the negative-electrode layer. The density of the electrode is usually preferably 1.2 g/cm$^3$ or higher, more preferably 1.3 or higher, and is usually preferably 2.0 g/cm$^3$ or less, more preferably 1.9 g/cm$^3$ or less.

In case where the electrode density is too low, this electrode has an increased thickness and the amount of this electrode which can be packed in a battery decreases, resulting in a decrease in battery capacity. In case where the electrode density is too high, this electrode has a reduced amount of interparticle interstices therein, resulting in a decrease in the amount of the electrolytic solution which can be held in the interstices. In addition, the movability of Li ions is reduced, resulting in a decrease in high-rate charge/discharge characteristics.

Members for use in a nonaqueous-electrolyte secondary battery which employs the carbon material of the invention are explained below in detail as examples. However, usable materials, methods for production, etc. should not be construed as being limited to the following examples.

<Nonaqueous-Electrolyte Secondary Battery>

The basic configuration of the nonaqueous-electrolyte secondary battery, in particular, the lithium ion secondary battery, of the invention is the same as that of conventionally known lithium ion secondary batteries. This secondary battery is usually equipped with a positive electrode capable of occluding and releasing lithium ions, an electrolyte, etc., besides the negative electrode to which the carbon material for nonaqueous-electrolyte secondary-battery negative electrodes of the invention has been applied.

<Positive Electrode>

The positive electrode is an electrode obtained by forming a positive active layer including a positive active material and a binder on a current collector.

Positive Active Material

The positive active material (lithium-transition metal compound) to be used in the positive electrode is described below.

Lithium-Transition Metal Compound

The lithium-transition metal compound is a compound which has a structure capable of insertion and release of Li ions. Examples thereof include sulfides, phosphoric acid salt compounds, or lithium-transition metal composite oxides.

Examples of the sulfides include compounds having a two-dimensional lamellar structure, such as $TiS_2$ or $MoS_2$, or Chevrel compounds having a strong three-dimensional framework structure represented by the general formula $Me_xMo_6S_8$ (Me is any of various transition metals including Pb, Ag, and Cu).

Examples of the phosphoric acid salt compounds include ones belonging to the olivine structure, which are generally represented by $LiMePO_4$ (Me is at least one transition metal). Specific examples thereof include $LiFePO_4$, $LiCoPO_4$, $LiNiPO_4$, or $LiMnPO_4$.

Examples of the lithium-transition metal composite oxides include ones belonging to the spinel structure capable of three-dimensional diffusion or ones belonging to the lamellar structure which renders two-dimensional diffusion of lithium ions possible.

The composite oxides having a spinel structure are generally represented by $LiMe_2O_4$ (Me is at least one transition metal). Specific examples thereof include $LiMn_2O_4$, $LiCoMnO_4$, $LiNi_{0.5}Mn_{1.5}O_4$, or $LiCoVO_4$.

The composite oxides having a lamellar structure are generally represented by $LiMeO_2$ (Me is at least one transition metal). Specific examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, or $LiMnO_2$.

Composition

Examples of the lithium-containing transition metal compound further include a lithium-transition metal compound represented by the following empirical formula (A) or (B).

1) In the Case of Lithium-Transition Metal Compound Represented by the following Empirical Formula (A)

$$Li_{1+x}MO_2 \tag{A}$$

In formula (A), x is usually 0-0.5. M is elements configured of Ni and Mn or of Ni, Mn, and Co. The Mn/Ni molar ratio is usually 0.1-5. The Ni/M molar ratio is usually 0-0.5. The Co/M molar ratio is usually preferably 0-0.5. There are cases where the excess portion of lithium which is represented by x has been incorporated as a substituent into the transition metal sites M.

Although the oxygen amount in terms of atomic ratio in empirical formula (A) is 2 for reasons of convenience, the composition may be non-stoichiometric to some degree. Symbol x in the empirical formula indicates the composition of the feed materials used for producing the lithium-transition metal compound. Since the batteries to be supplied to the market are usually aged after battery assembly, there are cases where the positive electrode has a deficiency in lithium amount due to the charge/discharge. There are hence cases where such a battery, when examined in the state of having been discharged to 3 V, has a composition in which x is −0.65 to 1.

When the lithium-transition metal compound is a compound produced through burning at a high temperature in an oxygen-containing gas atmosphere in order to enhance the crystallinity of the positive active material, this lithium-transition metal compound brings about excellent battery characteristics.

Furthermore, the lithium-transition metal compound represented by empirical formula (A) may be a solid solution with $Li_2MO_3$, which is called a 213 layer, as shown by the following general formula (N).

$$\alpha Li_2MO_3 \cdot (1-\alpha)LiM'O_2 \tag{A'}$$

In the general formula, $\alpha$ is a number which satisfies $0<\alpha<1$.

M is at least one metallic element having an average oxidation number of $4^+$. Specifically, M is at least one metallic element selected from the group consisting of Mn, Zr, Ti, Ru, Re, and Pt.

M' is at least one metallic element having an average oxidation number of $3^+$. M preferably is at least one metallic element selected from the group consisting of V, Mn, Fe, Co, and Ni, and more preferably is at least one metallic element selected from the group consisting of Mn, Co, and Ni.

2) In the Case of Lithium-Transition Metal Compound Represented by the following General Formula (B).

$$Li[Li_aM_bMn_{2-b-a}]O_{4+\delta} \tag{B}$$

In the formula, M is one or more elements configured of at least one transition metal selected from Ni, Cr, Fe, Co, Cu, Zr, Al, and Mg.

It is preferred that the value of b should be usually 0.4-0.6. So long as the value of b is within this range, the energy density per unit weight of the lithium-transition metal compound is high.

It is preferred that the value of a should be usually 0-0.3. Symbol a in the empirical formula indicates the composition of the feed materials used for producing the lithium-transition metal compound. Since the batteries to be supplied to the market are usually aged after battery assembly, there are cases where the positive electrode has a deficiency in lithium amount due to the charge/discharge. There are hence cases where such a battery, when examined in the state of having been discharged to 3 V, has a composition in which the value of a is −0.65 to 1. So long as the value of a is within this range, the energy density per unit weight of the lithium-transition metal compound is not impaired considerably and satisfactory load characteristics are obtained.

Furthermore, it is preferred that the value of $\delta$ should be usually in the range of ±0.5. So long as the value of $\delta$ is within this range, the crystal structure is highly stable and the battery having an electrode produced using this lithium-transition metal compound has satisfactory cycle characteristics and high-temperature storability.

The chemical meaning of the lithium composition in a lithium-nickel-manganese composite oxide as a composition of the lithium-transition metal compound is explained below in detail. The values of a and b in the empirical formula of the lithium-transition metal compound are determined by analyzing the compound with an inductively coupled plasma emission spectroscope (ICP-AES) for the contents of each transition metal and lithium to determine a Li/Ni/Mn ratio and calculating the values of a and b therefrom.

From the standpoint of structure, it is thought that the lithium which is expressed using the affix a has been incorporated as a substituent into sites of the same transition metal. On the principle of charge neutralization, the average valence of M and manganese is higher than 3.5 because of the lithium expressed using the affix a.

The lithium-transition metal compound may have been substituted with fluorine, and this compound is expressed by $LiMn_2O_{4-x}F_{2x}$.

Specific examples of the lithium-transition metal compound having the blend composition described above include $Li_{1+x}Ni_{0.5}Mn_{0.5}O_2$, $Li_{1+x}Ni_{0.85}Co_{0.10}Al_{0.05}O_2$, $Li_{1+x}Ni_{0.33}Mn_{0.33}Co_{0.33}O_2$, $Li_{1+x}Ni_{0.45}Mn_{0.45}Co_{0.10}O_2$, $Li_{1+x}Mn_{1.8}Al_{0.2}O_4$, and $Li_{1+x}Mn_{1.5}Ni_{0.5}O_4$. One of these lithium-transition metal compounds may be used alone, or a blend of two or more thereof may be used.

Furthermore, with respect to incorporation of different elements, the lithium-transition metal compound may contain one or more different elements incorporated thereinto. The different elements are selected from any one or more of B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, I, As, Ge, P, Pb, Sb, Si, and Sn.

These different elements may have been incorporated into the crystal structure of the lithium-transition metal compound, or may localize in the surface of the particles or at the crystal grain boundaries, etc., in the form of a simple substance or compound without being incorporated into the crystal structure of the lithium-transition metal compound.

<Positive Electrode for Lithium Secondary Battery>

The positive electrode for lithium secondary batteries is an electrode obtained by forming on a current collector a positive active layer that includes a powder of the lithium-transition metal compound described above, which is for use as a positive-electrode material for lithium secondary batteries, and a binder.

The positive active layer is usually produced by mixing the positive-electrode material and a binder together with optional ingredients, e.g., a conductive material and a thickener, by a dry process, forming the mixture into a sheet, and press-bonding the sheet to a positive current collector, or by dissolving or dispersing these materials in a liquid medium to obtain a slurry, applying the slurry to a positive current collector, and drying the slurry applied.

As the material of the positive current collector, use is usually made of a metallic material such as aluminum, stainless steel, a nickel-plated material, titanium, or tantalum or a carbon material such as a carbon cloth or a carbon paper. With respect to shape, examples of shapes in the case of metallic materials include metal foils, metal cylinders, metal coils, metal plates, thin metal films, expanded metals, punching metals, and metal foam. In the case of carbon materials, examples of the shapes thereof include carbon plates, thin carbon films, and carbon cylinders. The thin films may be suitably processed into a mesh form.

In the case where a thin film is used as the positive current collector, this thin film may have any desired thickness. However, it is preferred that the thickness thereof should be generally in the range of 1 μm to 100 mm. In case where the thin film has a thickness less than that range, there is a possibility that this film might be insufficient in the strength required of current collectors. On the other hand, in case where the film has a thickness larger than that range, there is a possibility that this film might have impaired handleability.

The binder to be used for producing the positive active layer is not particularly limited. In the case of layer formation through coating fluid application, use may be made of a material which is stable to the liquid medium to be used for electrode production. Examples thereof include resinous polymers such as polyethylene, polypropylene, poly(ethylene terephthalate), poly(methyl methacrylate), aromatic polyamides, cellulose, and nitrocellulose, rubbery polymers such as SBR (styrene/butadiene rubbers), NBR (acrylonitrile/butadiene rubbers), fluororubbers, isoprene rubbers, butadiene rubbers, and ethylene/propylene rubbers, thermoplastic elastomeric polymers such as styrene/butadiene/styrene block copolymers and products of hydrogenation thereof, EPDM (ethylene/propylene/diene terpolymers), styrene/ethylene/butadiene/ethylene copolymers, and styrene/isoprene/styrene block copolymers and products of hydrogenation thereof, flexible resinous polymers such as syndiotactic 1,2-polybutadiene, poly(vinyl acetate), ethylene/vinyl acetate copolymers, and propylene/α-olefin copolymers, fluorochemical polymers such as poly(vinylidene fluoride), polytetrafluoroethylene, fluorinated poly(vinylidene fluoride), and polytetrafluoroethylene/ethylene copolymers, and polymer compositions having the property of conducting alkali metal ions (especially lithium ions). One of these substances may be used alone, or any desired two or more thereof may be used in combination in any desired proportion.

It is preferred that the proportion of the binder in the positive active layer should be usually 0.1-80% by mass. In case where the proportion of the binder is too low, there is a possibility that the positive active material cannot be sufficiently held and the positive electrode might have insufficient mechanical strength, resulting in a decrease in battery performance, e.g., cycle characteristics. On the other hand, in case where the proportion thereof is too high, there is a possibility that such too high a proportion might lead to a decrease in battery capacity or electrical conductivity.

A conductive material is usually incorporated into the positive active layer in order to enhance electrical conductivity. Although there are no particular limitations on the kind thereof, examples of the conductive material include metallic materials such as copper and nickel and carbon materials such as graphites, e.g., natural graphites and artificial graphites, carbon blacks, e.g., acetylene black, and amorphous carbon, e.g., needle coke. One of these substances may be used alone, or any desired two or more thereof may be used in combination in any desired proportion. It is preferred that the proportion of the conductive material in the positive active layer should be usually 0.01-50% by mass. When the proportion of the conductive material is too low, there are cases where the layer has insufficient electrical conductivity. Conversely, when the proportion thereof is too high, there are cases where a decrease in battery capacity results.

The liquid medium for slurry formation is not particularly limited in the kind thereof so long as the liquid medium is a solvent in which the lithium-transition metal compound powder serving as a positive-electrode material, a binder, and a conductive material and a thickener that are used according to need can be dissolved or dispersed. Either an aqueous solvent or an organic solvent may be used.

Examples of the aqueous solvent include water and alcohols. Examples of the organic solvent include N-methylpyrrolidone (NMP), dimethylformamide, dimethylacetamide, methyl ethyl ketone, cyclohexanone, methyl acetate, methyl acrylate, diethyltriamine, N,N-dimethylaminopropylamine, ethylene oxide, tetrahydrofuran (THF), toluene, acetone, dimethyl ether, dimethylacetamide, hexamethylphosphoramide, dimethyl sulfoxide, benzene, xylene, quinoline, pyridine, methylnaphthalene, and hexane. Especially when an aqueous solvent is used, a dispersant is added in combination with a thickener to slurry the mixture using a latex of, for example, an SBR. One of those solvents may be used alone, or any desired two or more thereof may be used in combination in any desired proportion.

It is preferred that the content of the lithium-transition metal compound powder, as a positive-electrode material, in the positive active layer should be usually 10-99.9% by mass. In case where the content of the lithium-transition metal compound powder in the positive active layer is too high, this positive electrode tends to have insufficient strength. When the content thereof is too low, there are cases where an insufficient capacity results.

It is also preferred that the thickness of the positive active layer should be usually about 10-200 µm. With respect to the electrode density of the positive electrode which has been pressed, it is preferred that the density thereof should be usually 2.2-4.2 g/cm$^3$. It is preferred that the positive active layer obtained through coating fluid application and drying should be densified with a roller press or the like in order to heighten the loading density of the positive active material. Thus, a positive electrode for lithium secondary batteries can be prepared.

<Nonaqueous Electrolyte>

Examples of the nonaqueous electrolyte include known nonaqueous electrolytic solutions, solid polymer electrolytes, gel electrolytes, and solid inorganic electrolytes. Preferred of these are nonaqueous electrolytic solutions. A nonaqueous electrolytic solution is configured by dissolving a solute (electrolyte) in a nonaqueous solvent.

<Electrolyte>

There are no limitations on the electrolyte to be used in the nonaqueous electrolytic solution, and a known substance which is used as an electrolyte can be employed at will and incorporated. In the case where the nonaqueous electrolytic solution according to the invention is to be used in the nonaqueous-electrolyte secondary battery, it is preferred that the electrolyte should be a lithium salt.

Examples of the electrolyte include $LiPF_6$, $LiBF_4$, $LiCF_3SO_3$, $LiN(CF_3SO_2)_2$, $LiN(C_2F_5SO_2)_2$, lithium bis(oxalato)borate, lithium difluorooxalatoborate, lithium tetrafluorooxalatophosphate, lithium difluorobis(oxalato)phosphate, and lithium fluorosulfonate. One of these electrolytes may be used alone, or any desired two or more thereof may be used in combination in any desired proportion.

The concentration of such lithium salts in the electrolytic solution is not limited. However, the concentration thereof is usually preferably 0.5 mol/L or higher, more preferably 0.6 mol/L or higher, even more preferably 0.8 mol/L or higher, and is usually preferably 3 mol/L or less, more preferably 2 mol/L or less, even more preferably 1.5 mol/L or less. When the total molar concentration of the lithium salts is within that range, the electrolytic solution has sufficient electrical conductivity. Meanwhile, decreases in electrical conductivity and battery performance due to an increase in viscosity can be avoided.

<Nonaqueous Solvent>

The nonaqueous solvent to be contained in the nonaqueous electrolytic solution is not particularly limited so long as the nonaqueous solvent is a solvent which, when used in a battery, does not exert an adverse influence on the battery characteristics. Examples of nonaqueous solvents in ordinary use include chain carbonates such as dimethyl carbonate, ethyl methyl carbonate, and diethyl carbonate, cyclic carbonates such as ethylene carbonate, propylene carbonate, and butylene carbonate, chain carboxylic acid esters such as methyl acetate, ethyl acetate, methyl propionate, and ethyl propionate, cyclic carboxylic acid esters such as γ-butyrolactone, chain ethers such as dimethoxyethane and diethoxyethane, cyclic ethers such as tetrahydrofuran, 2-methyltetrahydrofuran, and tetrahydropyran, nitriles such as acetonitrile, propionitrile, benzonitrile, butyronitrile, and valeronitrile, phosphoric acid esters such as trimethyl phosphate and triethyl phosphate, and sulfur-containing compounds such as ethylene sulfite, 1,3-propanesultone, methyl methanesulfonate, sulfolane, and dimethyl sulfone. In these compounds, the hydrogen atoms may have been partly replaced with halogen atoms.

Although these compounds may be used alone or in combination of two or more thereof, it is preferred to use two or more compounds in combination. For example, it is preferred to use a high-permittivity solvent, e.g., a cyclic carbonate or a cyclic carboxylic acid ester, in combination with a low-viscosity solvent, e.g., a chain carbonate or a chain carboxylic acid ester.

The term high-permittivity solvent herein means a compound having a relative permittivity at 25° C. of 20 or higher. It is preferred that any of ethylene carbonate, propylene carbonate, and compounds formed by replacing hydrogen atoms of these carbonates with another element, e.g., a halogen, or with an alkyl, etc., among the high-permittivity solvents, should be contained in the electrolytic solution. The proportion of the high-permittivity solvent in the electrolytic solution is preferably 15% by mass or higher, more preferably 20% by mass or higher, most preferably 25% by mass or higher. When the content of the high-permittivity solvent is less than that range, there are cases where the desired battery characteristics are not obtained.

<Aids>

Besides the electrolyte and nonaqueous solvent described above, aids may be suitably incorporated into the nonaqueous electrolytic solution according to purposes. Examples of aids which have the effect of forming a coating film on the surface of the negative electrode to thereby improve the life of the battery include unsaturated cyclic carbonates such as vinylene carbonate, vinylethylene carbonate, and ethynylethylene carbonate, cyclic carbonates having one or more fluorine atoms, such as fluoroethylene carbonate, and fluorinated unsaturated cyclic carbonates such as 4-fluorovinylene carbonate.

Examples of overcharge inhibitors, by which batteries are effectively inhibited from exploding or catching fire when in an overcharged state or the like, include aromatic compounds such as biphenyl, cyclohexylbenzene, diphenyl ether, t-butylbenzene, t-pentylbenzene, diphenyl carbonate, and methyl phenyl carbonate.

Examples of aids which improve cycle characteristics or low-temperature discharge characteristics include lithium salts such as lithium monofluorophosphate, lithium difluorophosphate, lithium fluorosulfonate, lithium bis(oxalato)borate, lithium difluorooxalatoborate, lithium tetrafluorooxalatophosphate, and lithium difluorobis(oxalato)phosphate.

Examples of aids which are capable of improving capacity retentivity after high-temperature storage and cycle characteristics include sulfur-containing compounds such as ethylene sulfite, propanesultone, and propenesultone, carboxylic acid anhydrides such as succinic anhydride, maleic anhydride, and citraconic anhydride, and nitrile compounds such as succinonitrile, glutaronitrile, adiponitrile, and pimelonitrile. The amount of these aids to be incorporated is not particularly limited, and the aids can be incorporated in any desired amount unless the effects of the invention are considerably lessened thereby.

<Separator>

A separator is usually interposed between the positive electrode and the negative electrode in order to prevent a short-circuit. In this case, the nonaqueous electrolytic solution according to the invention is usually infiltrated into the separator and used.

The separator is not particularly limited in the material and shape thereof, and any desired known separator can be employed unless the effects of the invention are considerably lessened thereby. In particular, use may be made of a resinous, glass-fiber, inorganic, or another separator which is constituted of a material that is stable to the nonaqueous electrolytic solution according to the invention. It is preferred to use a separator in the form of a porous sheet, nonwoven fabric, or the like which has excellent liquid retentivity.

Examples of the material of the resinous or glass-fiber separator include polyolefins such as polyethylene and polypropylene, aromatic polyamides, polytetrafluoroethylene, polyethersulfones, and glass filters. Preferred of these are glass filters and polyolefins. More preferred are polyolefins. One of these materials may be used alone, or any desired two or more thereof may be used in combination in any desired proportion.

The separator may have any desired thickness. However, the thickness thereof is usually preferably 1 μm or larger, more preferably 5 μm or larger, even more preferably 10 μm or larger, and is usually preferably 50 μm or less, more preferably 40 μm or less, even more preferably 30 μm or less. When the separator is thinner than that range, there are cases where this separator is reduced in insulating properties and mechanical strength. When the separator is thicker than that range, not only there are cases where battery performance such as, for example, rate characteristics, decreases but also there are cases where the nonaqueous-electrolyte secondary battery as a whole has a reduced energy density.

In the case where a porous material, such as, for example, a porous sheet or nonwoven fabric, is used as the separator, this separator may have any desired porosity. However, the porosity thereof is usually preferably 20% or higher, more preferably 35% or higher, even more preferably 45% or higher, and is usually preferably 90% or less, more preferably 85% or less, even more preferably 75% or less. In case where the porosity thereof is lower than that range, there is a tendency that this separator has increased membrane resistance, resulting in impaired rate characteristics. In case where the porosity thereof is higher than that range, there is a tendency that this separator has reduced mechanical strength, resulting in a decrease in insulating properties.

The separator may have any desired average pore diameter. However, the average pore diameter thereof is usually preferably 0.5 μm or less, more preferably 0.2 μm or less, and is usually preferably 0.05 μm or larger. In case where the average pore diameter thereof exceeds that range, a short-circuit is apt to occur. When the average pore diameter thereof is less than that range, there are cases where this separator has increased membrane resistance, resulting in a decrease in rate characteristics.

On the other hand, examples of the inorganic material include oxides such as alumina or silicon dioxide, nitrides such as aluminum nitride or silicon nitride, and sulfates such as barium sulfate or calcium sulfate. Examples of the shape thereof include particulate shapes or fibrous shapes.

With respect to form, use may be made of a separator in a thin film form such as, for example, nonwoven fabric, woven fabric, or microporous film. In the case of a thin film form, use of a thin film having a pore diameter of 0.01-1 μm and a thickness of 5-50 μm is suitable. Besides the independent thin film form, use can be made of a separator obtained by forming a composite porous layer containing particles of the inorganic material on the surface layer of the positive electrode and/or negative electrode using a resinous binder. Examples thereof include to form a porous layer including alumina particles having a 90% particle diameter of less than 1 μm on each surface of the positive electrode using a fluororesin as a binder.

The properties of the separator in a non-electrolyte secondary battery can be grasped in terms of Gurley value. Gurley value indicates the degree in which air is less apt to pass through in the film thickness direction, and is given in terms of the number of seconds required for 100 mL of air to pass through the film. Consequently, the smaller the value thereof, the more the film is air-permeable; and the larger the value thereof, the less the film is air-permeable. Namely, smaller values thereof mean that the pores have satisfactory communicating properties in the film thickness direction, and larger values thereof mean that the pores have poor communicating properties in the film thickness direction.

Communicating properties are the degree in which the pores communicate with one another in the film thickness direction. When the separator according to the invention has a small Gurley value, this separator can be used in various applications. In the case where the separator is used as the separator of, for example, a nonaqueous lithium secondary battery, the small Gurley value thereof means that the movement of lithium ions is easy. This separator is preferred because excellent battery performance is brought about.

The separator may have any desired Gurley value. However, the Gurley value thereof is preferably 10-1,000 sec/100 mL, more preferably 15-800 sec/100 mL, even more preferably 20-500 sec/100 mL. So long as the Gurley value thereof is 1,000 sec/100 mL or less, the electrical resistance is substantially low and this separator is preferred.

<Battery Design>

Electrode Group

Use may be made of either an electrode group having a multilayer structure obtained by stacking the positive plate and the negative plate together with the separator interposed therebetween or an electrode group having a structure obtained by winding the positive plate and the negative plate into a spiral together with the separator interposed therebetween. The proportion of the volume of the electrode group to the internal volume of the battery (hereinafter referred to as electrode group proportion) is usually preferably 40% or higher, more preferably 50% or higher, and is usually preferably 90% or less, more preferably 80% or less.

In case where the electrode group proportion is less than that range, a decrease in battery capacity results. On the other hand, in case where the electrode group proportion exceeds that range, the battery has too small a space volume and undergoes an increase in internal pressure when the battery heats up to cause members to expand or a liquid component of the electrolyte to have a heightened vapor pressure. There are hence cases where this battery is reduced in various characteristics including charge/discharge cycle performance and high-temperature storability, and where the gas release valve, which releases the internal pressure outside, works.

<Outer Case>

The material of the outer case to be used is not particularly limited so long as the material is stable to the nonaqueous electrolytic solution to be used. Examples thereof include metals, e.g., a nickel-plated steel sheet, stainless steel, aluminum or an aluminum alloy, and a magnesium alloy, or a laminated film composed of a resin and an aluminum foil. From the standpoint of weight reduction, a metal such as aluminum or an aluminum alloy or a laminated film is preferred of these.

Examples of the outer case employing any of those metals include: an outer case formed by fusion-bonding the metal to itself by laser welding, resistance welding, or ultrasonic welding to constitute a sealed structure; or an outer case formed by caulking the metal through a resinous gasket to constitute a caulked structure.

Examples of the outer case employing the laminated film include an outer case having a sealed structure obtained by thermally fusion-bonding the resin layer to itself. A resin which is different from the resin used in the laminated film may be interposed between the resin layers in order to enhance sealing properties.

Especially in the case where resin layers are thermally fusion-bonded to each other through collector terminals to form a sealed structure, either a resin having polar groups or a resin which has been modified by introducing polar groups thereinto is suitable for use as the resin to be interposed, because metal/resin bonding is involved.

<Protective Element>

As a protective element, use can be made of a PTC (positive temperature coefficient), which increases in resistance upon abnormal heating-up or when an excessive current flows, a temperature fuse, a thermister, a valve (current breaker valve) which, upon abnormal heating-up, breaks the current flowing through the circuit, on the basis of an abrupt increase in the internal pressure or internal temperature of the battery, or the like. It is preferred to select such a protective element which does not work under ordinary high-current use conditions. It is more preferred to employ a design which prevents abnormal heating-up and thermal run-away even without a protective element.

<Case>

The nonaqueous-electrolyte secondary battery of the invention is usually fabricated by housing the nonaqueous electrolytic solution, negative electrode, positive electrode, separator, etc. in a case. This case is not particularly limited, and a known case can be employed at will unless this case considerably lessens the effects of the invention. Specifically, although the case may be made of any desired material, use is generally made of nickel-plated iron, stainless steel, aluminum or an alloy thereof, nickel, titanium, or the like.

The case may have any desired shape. For example, the case may be any of the cylindrical type, prismatic type, laminate type, coin type, large type, and the like.

EXAMPLES

Specific embodiments of the invention are explained below in more detail by reference to Examples, but the invention should not be construed as being limited by the following Examples.

In this description, properties such as particle diameter, tap density, BET specific surface area, true density, X-ray diffraction, coverage in a multilayered carbon powder material, Raman R, aspect ratio, O/C value, degree of circularity, amount of eliminated CO, etc. were determined in the following manners.

Particle Diameter: About 20 mg of a carbon powder was added to about 1 mL of a 2% (by volume) aqueous solution of poly(oxyethylene(20)) sorbitan monolaurate, and this mixture was dispersed in about 200 mL of ion-exchanged water. The resultant dispersion was examined for volume-based particle size distribution with a laser diffraction type particle size distribution analyzer (LA-920, manufactured by HORIBA, Ltd.) to determine the average particle diameter (median diameter), d10 particle diameter, i.e., particle diameter at 10% cumulation, and d90 particle diameter, i.e., particle diameter at 90% cumulation. The measuring conditions include an ultrasonic dispersion period of 1 minute, ultrasonic intensity of 2, circulation speed of 2, and relative refractive index of 1.50.

Tap Density: A measurement was made using powder densimeter Tap Denser KYT-3000 [manufactured by Seishin Enterprise Co., Ltd.]. A carbon powder was dropped into a 20-cc tapping cell from a sieve having an opening size of 300 μm to fill up the cell. Thereafter, a tapping operation was conducted 1,000 times over a stroke length of 10 mm. The density thus determined was taken as the tap density.

Aspect Ratio:

To 100 parts by weight of a carbon material for electrodes were added 100 parts by weight of a 1% aqueous solution of carboxymethyl cellulose and 2 parts by weight of a 50% aqueous dispersion of a styrene/butadiene rubber. This mixture was kneaded to obtain a slurry. This slurry was applied to a copper foil in an amount of 12 mg/cm$^2$ by the doctor blade method and dried at 110° C. to obtain a coated type electrode. Subsequently, this coated type electrode was cut along a direction perpendicular to the coating surface, and the resultant cut surface was photographed with an electron microscope. With respect to 50 particles within an area selected at will, the lengths of the longest axis a (μm) and of the shortest axis b (μm) of the section of each particle were measured to determine the value of a/b, and an average value of a/b for the 50 particles was taken as the aspect ratio.

Amount of CO Eliminated during Heating to 1,000° C. Determined with Temperature Programmed Decomposition Mass Spectrometer (TPD-MS): A carbon material was heated from room temperature to 1,000° C. at a heating rate of 20° C./min while passing helium gas thereover at a rate of 60 mL/min, and the amount of the CO (carbon monoxide) which generated during the heating was determined with a mass spectrometer. The results were expressed in terms of the amount of CO (μmol) generated per gram of the carbon material.

Average Degree of Circularity: A flow type particle image analyzer (FPIA-2000, manufactured by To a Medical Electronics Inc.) was used to determine a particle diameter distribution in terms of equivalent-circle diameter and to calculate the degree of circularity. Ion-exchanged water was used as a dispersion medium, and poly(oxyethylene(20)) monolaurate was used as a surfactant. The equivalent-circle diameter for a particle image obtained by photographing is the diameter of a circle (equivalent circle) having the same projected area as the particle image, and the degree of circularity is the ratio of the peripheral length of the equivalent circle, as numerator, to the peripheral length of the projected particle image obtained by photographing, as denominator. Particles in the range of 1.5-40 μm were examined, and the degrees of circularity thereof were averaged to determine the average degree of circularity.

Number-Based Content of Fine Powder of 3 μm or Smaller: A flow type particle image analyzer (FPIA-2000, manufactured by To a Medical Electronics Inc.) was used to determine a particle diameter distribution. Ion-exchanged water was used as a dispersion medium, and poly(oxyethylene(20)) monolaurate was used as a surfactant. An ultrasonic dispersion treatment was conducted for 5 minutes. The proportion of the number of particles of 3 μm or smaller to the number of all particles was determined from the resultant number-based particle size distribution, and was expressed in terms of %.

BET Specific Surface Area: A measurement was made with AMS-8000, manufactured by Ohkura Riken Co., Ltd. A carbon material was predried at 250° C., and nitrogen gas was passed thereover for further 30 minutes. Thereafter, this carbon material was examined by the BET one-point method based on nitrogen gas adsorption.

True Density: A pycnometer was used to make a measurement using a 0.1% aqueous solution of a surfactant as a medium.

X-Ray Diffraction: To a carbon powder was added about 15% standard high-purity silicon powder for X-ray analysis. The powders were mixed together, and the resultant mixture as a material was examined for wide-angle X-ray diffraction curve by the reflection diffractometer method in which a CuKα line obtained as monochromatic light with a graphite monochromator was used as a line source. The interplanar spacing (d002) and the crystallite size (Lc) were determined using the method of the Japan Society for Promotion of Scientific Research.

O/C Value (%)=[concentration of oxygen atoms determined from the area of O1s spectral peak in X-ray photoelectron spectroscopy (XPS)]×100/ [concentration of carbon atoms determined from the area of C1s spectral peak in XPS]

An examination by X-ray photoelectron spectroscopy (XPS) is conducted using an X-ray photoelectron spectrometer in the following manner. A specimen to be examined is placed on a sample stage so that the specimen has a flat surface. A Kα line of aluminum is used as an X-ray source to subject the specimen to a multiplex examination to obtain a spectrum with respect to C1s (280-300 eV) and O1s (525-545 eV). A charge correction is conducted, while taking the energy value of the resultant C1s peak top as 284.3 eV, to determine the areas of the C1s and O1s spectral peaks. Furthermore, the sensitivity coefficient of the apparatus is multiplied to calculate the concentration of surface carbon atoms and the concentration of surface oxygen atoms.

Coverage in Complex Structure Carbon Material: The coverage in a complex structure carbon material was determined in accordance with the following equation.

Coverage (mass %)=100−(K×D)/[(K+T)×N]×100

In the equation, K indicates the mass (kg) of the spherical graphitic carbon which was mixed with tar pitch, T indicates the mass (kg) of the tar pitch, as a raw covering material, which was mixed with the spherical graphitic carbon, D indicates the amount of that part of the mixture of K and T which was actually subjected to burning, and N indicates the mass of the covered spherical graphitic carbon material which had undergone burning.

Raman Analysis: NR-1800, manufactured by JASCO Corp., was used to conduct Raman spectral analysis using argon ion laser light having a wavelength of 514.5 nm. In this analysis, the intensity IA of a peak PA around 1,580 cm$^{-1}$ and the intensity IB of a peak PB around 1,360 cm$^{-1}$ were measured, and the ratio between these intensities R(R=IB/IA) was determined. In sample preparation, the sample in a powder state was charged into a cell by causing the sample to fall naturally into the cell. While the surface of the sample in the cell was being irradiated with the laser light, the cell was rotated in a plane perpendicular to the laser light to conduct the analysis.

Example 1

Flaky graphite particles which were a naturally occurring graphite and had a 002-plane interplanar spacing (d002) and an Lc, determined by wide-angle X-ray diffractometry, of 0.336 nm and 100 nm or larger, respectively, a tap density of 0.46 g/cm$^3$, a Raman R value, which is the ratio of the intensity of a peak around 1,360 cm$^{-1}$ to the intensity of a peak around 1,580 cm$^{-1}$ in the argon ion laser Raman spectrum, of 0.13, an average particle diameter of 28.7 μm, and a true density of 2.26 g/cm$^3$ were continuously treated with Hybridization System, manufactured by Nara Machinery Co., Ltd., under the conditions of a rotor peripheral speed of 40 m/sec and 10 minutes at a treatment rate of 20 kg/hr. Thus, the flaky graphite particles were rounded while damaging the surface of the graphite particles. Thereafter, classification was further conducted to remove fine particles and coarse particles.

The rounded graphitic carbon thus obtained had a 002-plane interplanar spacing (d002) and an Lc, determined by wide-angle X-ray diffractometry, of 0.336 nm and 100 nm or larger, respectively, a tap density of 1.01 g/cm$^3$, an aspect ratio of 1.9, a Raman R value, which is the ratio of the intensity of a peak around 1,360 cm$^{-1}$ to the intensity of a peak around 1,580 cm$^{-1}$ in the argon ion laser Raman spectrum, of 0.24, an average particle diameter of 16.1 μm, a BET specific surface area of 7.0 m$^2$/g, a true density of 2.26 g/cm$^3$, and an average degree of circularity of 0.93.

Subsequently, 100 parts by weight of this rounded graphitic carbon was mixed with 33 parts by weight of a petroleum-derived tar by means of a mixer, and the resultant mixture was burned by heating to 1,300° C. in a non-oxidizing atmosphere and then cooled to room temperature. Subsequently, the resultant burning product was treated using an apparatus having a rotor including a casing and a plurality of blades disposed inside the casing. The rotor was rotated at a peripheral speed of 100 m/sec to thereby mechanically treat the burning product. Thus, a carbon material for electrodes was obtained. Properties of this carbon material for electrodes are shown in Table 1. In FIG. 1 is shown an electron photomicrograph of the carbon material for electrodes obtained in Example 1.

(Production and Evaluation of Electrode for Evaluation of Electrification-Solution Absorption Time)

To 100 parts by weight of the carbon material for electrodes were added 100 parts by weight of a 1% aqueous solution of carboxymethyl cellulose and 2 parts by weight of a 50% aqueous dispersion of a styrene/butadiene rubber. The mixture was kneaded to obtain a slurry. This slurry was applied to a copper foil in an amount of 12 mg/cm$^2$ by the doctor blade method. The coating was dried at 110° C. and then densified by pressing with a roller press so as to result in a density of 1.63 g/cc. A disk having a diameter of 12.5 mm was cut out of the coated foil and dried at 150° C. to obtain an electrode for evaluation of liquid penetrability. An electrolytic solution obtained by dissolving LiPF6 in an ethylene carbonate/dimethyl carbonate/ethyl methyl carbonate=3/3/4 (by mass) liquid mixture so as to result in an electrolyte concentration of 1.2 mol/L was dropped in an amount of 1 μL onto the electrode for liquid penetrability evaluation, and the time period required for the electrolytic solution to be absorbed in the electrode and completely disappear from the electrode surface was measured as an index to electrolytic-solution penetrability. The shorter the electrolytic-solution absorption time, the higher the electrolytic-solution penetrability.

(Production and Evaluation of Battery for Evaluation of Initial Battery Characteristics)

To 100 parts by weight of the carbon material for electrodes were added 100 parts by weight of a 1% aqueous solution of carboxymethyl cellulose and 2 parts by weight of a 50% aqueous dispersion of a styrene/butadiene rubber. The mixture was kneaded to obtain a slurry. This slurry was applied to a copper foil in an amount of 12 mg/cm² by the doctor blade method. The coating was dried at 110° C. and then densified by pressing with a roller press so as to result in a density of 1.63 g/cc. A disk having a diameter of 12.5 mm was cut out of the coated foil and vacuum-dried at 190° C. to obtain a negative electrode.

The negative electrode and lithium metal having a thickness of 0.5 mm were stacked together with a separator interposed therebetween which had been impregnated with an electrolytic solution. Thus, a coin battery for a charge/discharge test was produced. Used as the electrolytic solution was a solution obtained by dissolving LiPF6 in an ethylene carbonate/dimethyl carbonate/ethyl methyl carbonate=3/3/4 (by mass) liquid mixture so as to result in an electrolyte concentration of 1.2 mol/L.

This battery was repeatedly subjected three times to charging at 0.05 C (charge completion in 20 hr) to 1.5 V and discharging at 0.1 C (discharge completion in 10 hr) to 5 mV. The discharge capacity per unit amount of the active material as measured in the third cycle is shown in Table 1 as the discharge capacity of this electrode material. The total irreversible capacity per unit amount of the active material over the first to the third cycle is shown in Table 1 as the irreversible capacity of this electrode material.

(Production of Battery for Evaluation of High-Rate Charge/Discharge Characteristics and Cycle Characteristics)

To 100 parts by weight of the carbon material for electrodes were added 100 parts by weight of a 1% aqueous solution of carboxymethyl cellulose and 2 parts by weight of a 50% aqueous dispersion of a styrene/butadiene rubber. The mixture was kneaded to obtain a slurry. This slurry was applied to a copper foil in an amount of 12 mg/cm² by the doctor blade method. The coating was dried at 110° C. and then densified by pressing with a roller press so as to result in a density of 1.63 g/cc. A 32 mm×42 mm square was cut out of the coated foil and vacuum-dried at 190° C. to obtain a negative electrode.

To 93 parts by weight of a lithium-nickel-manganese-cobalt composite oxide powder were added 4 parts by weight of carbon black, 25 parts by weight of a 12% N-methylpyrrolidone solution of poly(vinylidene fluoride), and an appropriate amount of N-methylpyrrolidone. The resultant mixture was kneaded to obtain a slurry. This slurry was applied to an aluminum foil in an amount of 24.3 mg/cm² by the doctor blade method. The coating was dried at 110° C. and then densified by pressing with a roller press so that the resultant positive-electrode layer had a density of 2.7 g/cm³. A 30 mm×40 mm square was cut out of the coated foil and dried at 140° C. to obtain a positive electrode.

The negative electrode and the positive electrode were stacked together with a separator interposed therebetween which had been impregnated with an electrolytic solution. Thus, a battery for charge/discharge tests was produced. Used as the electrolytic solution was a solution obtained by dissolving LiPF6 in an ethylene carbonate/dimethyl carbonate/ethyl methyl carbonate=3/3/4 (by mass) liquid mixture so as to result in an electrolyte concentration of 1.2 mol/L and adding 2% by mass vinylene carbonate thereto.

This battery was first charged at 0.2 C to 4.1 V, further charged at 4.1 V until the current became 0.1 mA, and then discharged at 0.2 C to 3.0 V. Subsequently, this battery was charged at 0.2 C to 4.2 V, further charged at 4.2 V until the current became 0.1 mA, and then discharged at 0.2 C to 3.0 V; this operation was repeatedly conducted two times. Thus, initial conditioning was performed.

(Evaluation of High-Rate Discharge Characteristics)

Discharge tests were conducted in which the battery was charged at 0.2 C (charge completion in 5 hr) to 4.2 V and further charged at 4.2 V for 2 hours (0.2 C-CCCV) and the battery was thereafter discharged to 3.0 V at each of 0.2 C (discharge completion in 5 hr), 1 C (discharge completion in 1 hr), 2 C (discharge completion in 0.5 hr), 3 C (discharge completion in 0.33 hr), and 4 C (discharge completion in 0.25 hr). The results were expressed in terms of the proportion in % of the discharge capacity at each rate to the discharge capacity at 0.2 C (discharge completion in 5 hr) and shown in Table 1.

(Evaluation of High-Rate Charge Characteristics)

Charge tests were conducted in which the battery was charged at 0.2 C (charge completion in 5 hr) to 4.2 V and further charged at 4.2 V for 2 hours (0.2 C-CCCV) and the battery was charged to 4.2 V at each of 0.2 C (charge completion in 5 hr), 1 C (charge completion in 1 hr), 2 C (charge completion in 0.5 hr), 3 C (charge completion in 0.33 hr), and 4 C (charge completion in 0.25 hr). The results were expressed in terms of the proportion in % of the charge capacity in each charge test to the charge capacity observed in the charging at 0.2 C (charge completion in 5 hr) to 4.2 V and further charging at 4.2 V for 2 hours (0.2 C-CCCV), and were shown in Table 1. Incidentally, the battery which had undergone each charging was discharged at 0.2 C to 3.0 V.

(Evaluation of Cycle Characteristics)

The battery was repeatedly charged at 1 C to 4.2 V and discharged at 0.5 C (discharge completion in 2 hr) to 3.0 V. The proportion of the discharge capacity in the 500th cycle to the discharge capacity in the first cycle was determined as 500-cycle retention in % and shown in Table 1.

Comparative Example 1

Figure 2:
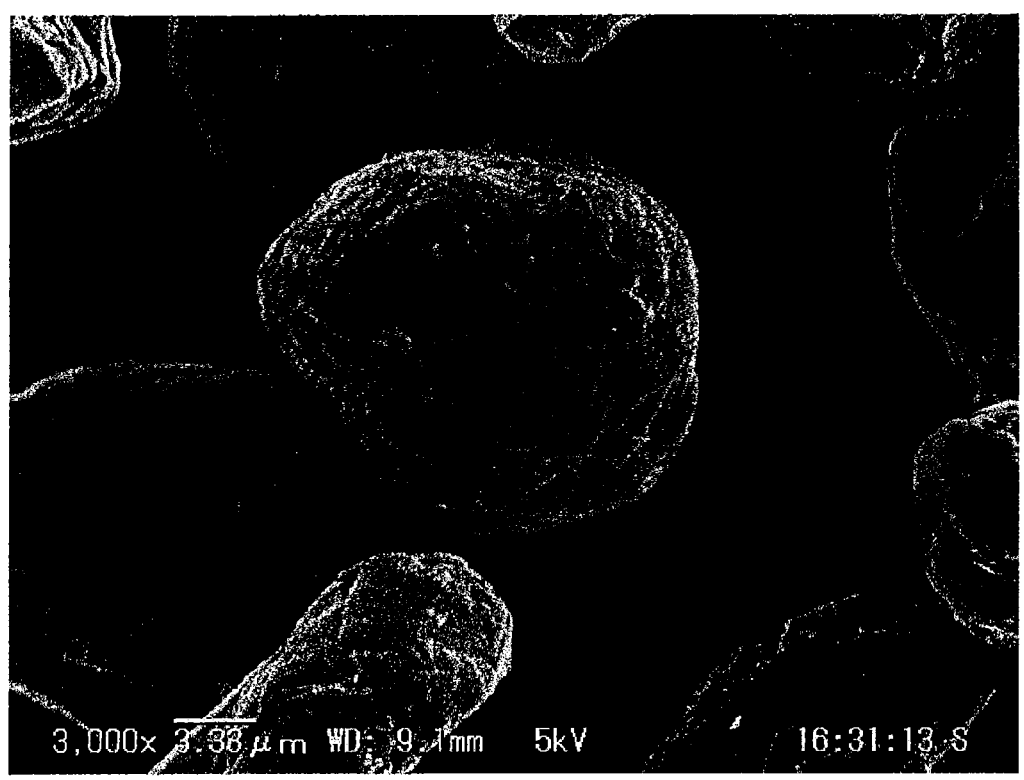
FIG. 2 is an electron photomicrograph of the carbon material for negative electrodes obtained in Comparative Example 1.

The same procedure as in Example 1 was conducted, except that the burning product was mechanically treated using the apparatus having a rotor including a casing and a plurality of blades disposed inside the casing, by rotating the rotor at a peripheral speed of 48 m/sec. Thus, a carbon material for electrodes was obtained. The results obtained are shown in Table 1. An electron photomicrograph of the carbon material for electrodes obtained in Comparative Example 1 is shown in FIG. 2.

Example 2

The same procedure as in Example 1 was conducted, except that the amount of the petroleum-derived tar to be mixed with 100 parts by weight of the rounded graphitic carbon was changed to 25 parts by weight and that the peripheral speed of the rotor in the mechanical treatment was changed to 83 m/sec. The results obtained are shown in Table 1.

Comparative Example 2

The same procedure as in Example 2 was conducted, except that the mechanical treatment was conducted by rotating the rotor at a peripheral speed of 48 m/sec. Thus, a carbon material for electrodes was obtained. The results obtained are shown in Table 1.

Example 3

The same procedure as in Example 2 was conducted, except that the temperature for the burning in a non-oxidizing atmosphere was changed to 1,000° C. The results obtained are shown in Table 1.

Comparative Example 3

The same procedure as in Example 3 was conducted, except that the mechanical treatment was conducted by rotating the rotor at a peripheral speed of 48 m/sec. Thus, a carbon material for electrodes was obtained. The results obtained are shown in Table 1.

Example 4

With 70% the carbon material for electrodes obtained in Example 2 were mixed 30% graphite particles which had a 002-plane interplanar spacing (d002) determined by wide-angle X-ray diffractometry of 0.336 nm, a tap density of 0.90 g/cm$^3$, a Raman R value, which is the ratio of the intensity of a peak around 1,360 cm$^{-1}$ to the intensity of a peak around 1,580 cm$^{-1}$ in the argon ion laser Raman spectrum, of 0.25, a BET specific surface area of 4.9 m$^2$/g, and an average particle diameter (d50) of 20 µm. The resultant electrode material was examined for electrolytic-solution absorption time, initial battery characteristics, high-rate discharge characteristics, high-rate charge characteristics, and cycle characteristics by the same methods as in Example 2. The results obtained are shown in Table 1.

Comparative Example 4

Figure 3:
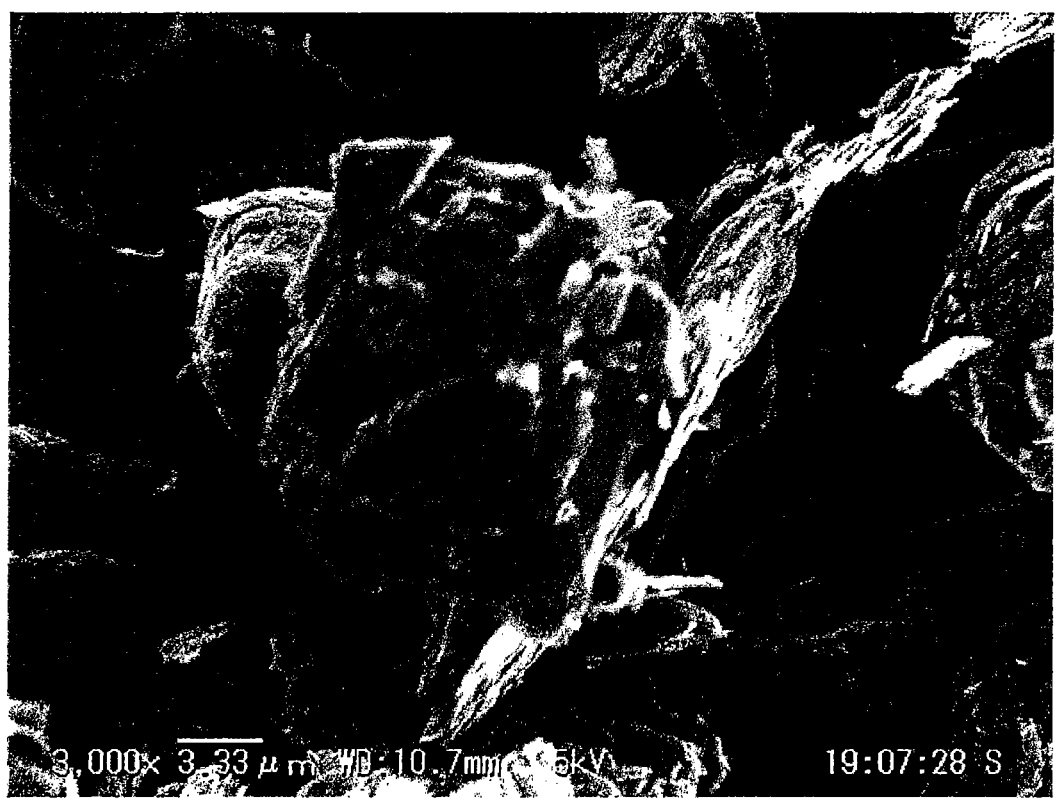
FIG. 3 is an electron photomicrograph of the carbon material for negative electrodes obtained in Comparative Example 4.

The same procedure as in Example 1 was conducted, except that 25 g of the burning product was introduced into a vibrating ball mill vessel which had an inner diameter of 60 mm and an inner height of 65 mm and in which a rod having an outer diameter of 40 mm and a height of 55 mm had been placed, and was mechanically treated therein for 3 minutes. The results obtained are shown in Table 1. An electron photomicrograph of the carbon material for electrodes obtained in Comparative Example 4 is shown in FIG. 3.

Comparative Example 5

Figure 4:
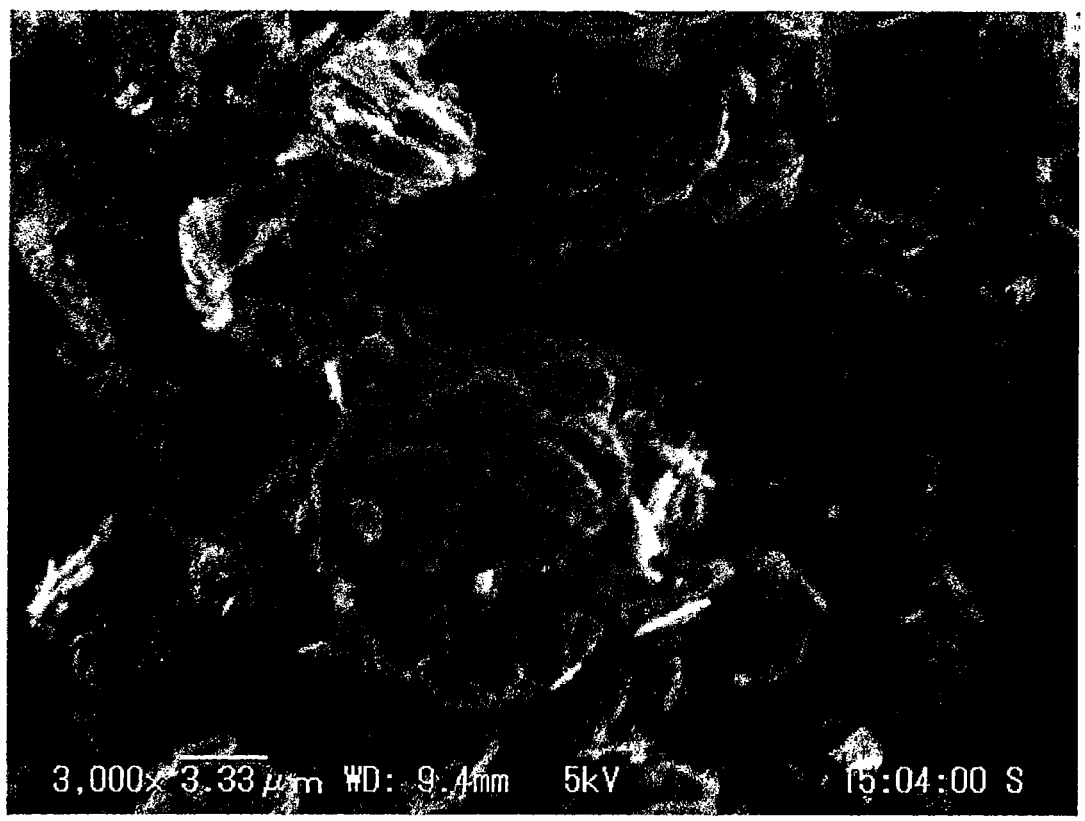
FIG. 4 is an electron photomicrograph of the carbon material for negative electrodes obtained in Comparative Example 5.

The same procedure as in Comparative Example 4 was conducted, except that the time period of the mechanical treatment was changed to 30 minutes. Properties of the resultant carbon material for electrodes are shown in Table 1. This carbon material for electrodes was used to produce a slurry in the same manner as in Example 1, and application of this slurry to a copper foil by the doctor blade method was attempted. However, the application resulted in streak lines, uncoated areas, etc., and failed to give an electrode suitable for battery evaluation. An electron photomicrograph of the carbon material for electrodes obtained in Comparative Example 5 is shown in FIG. 4.

Comparative Example 6

Figure 5:
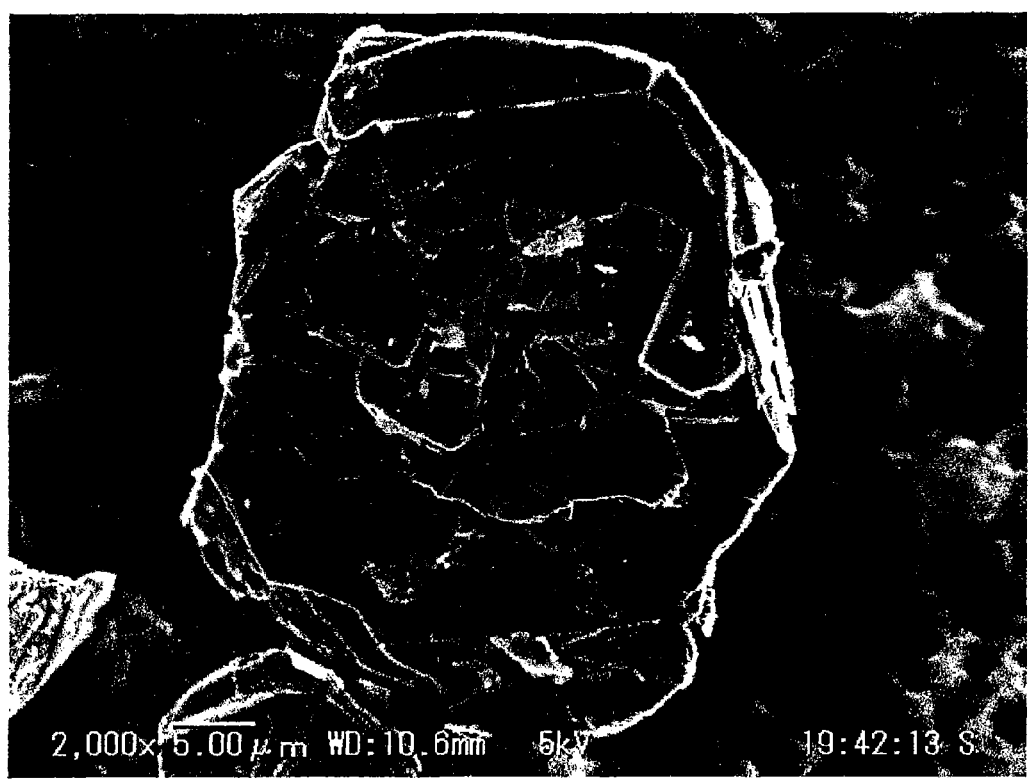
FIG. 5 is an electron photomicrograph of the carbon material for negative electrodes obtained in Comparative Example 6.

A hundred parts by weight of flaky graphite particles having a 002-plane interplanar spacing (d002) and an Lc, determined by wide-angle X-ray diffractometry, of 0.336 nm and 100 nm or larger, respectively, a tap density of 0.43 g/cm$^3$, a Raman R value, which is the ratio of the intensity of a peak around 1,360 cm$^{-1}$ to the intensity of a peak around 1,580 cm$^{-1}$ in the argon ion laser Raman spectrum, of 0.09, an average particle diameter of 23.9 µm, a true density of 2.26 g/cm$^3$, and an aspect ratio of 15 were mixed with 33 parts by weight of a petroleum-derived tar by means of a mixer. The resultant mixture was burned by heating to 1,300° C. in a stream of nitrogen gas which contained 500 rpm oxygen, and was then cooled to room temperature. Subsequently, the resultant burning product was treated using the apparatus having a rotor including a casing and a plurality of blades disposed inside the casing, in the same manner as in Example 1, except that the rotor was rotated at a peripheral speed of 48 m/sec to thereby pulverize the burning product. The results obtained are shown in Table 1. An electron photomicrograph of the carbon material for electrodes obtained in Comparative Example 6 is shown in FIG. 5.

Comparative Example 7

Figure 6:
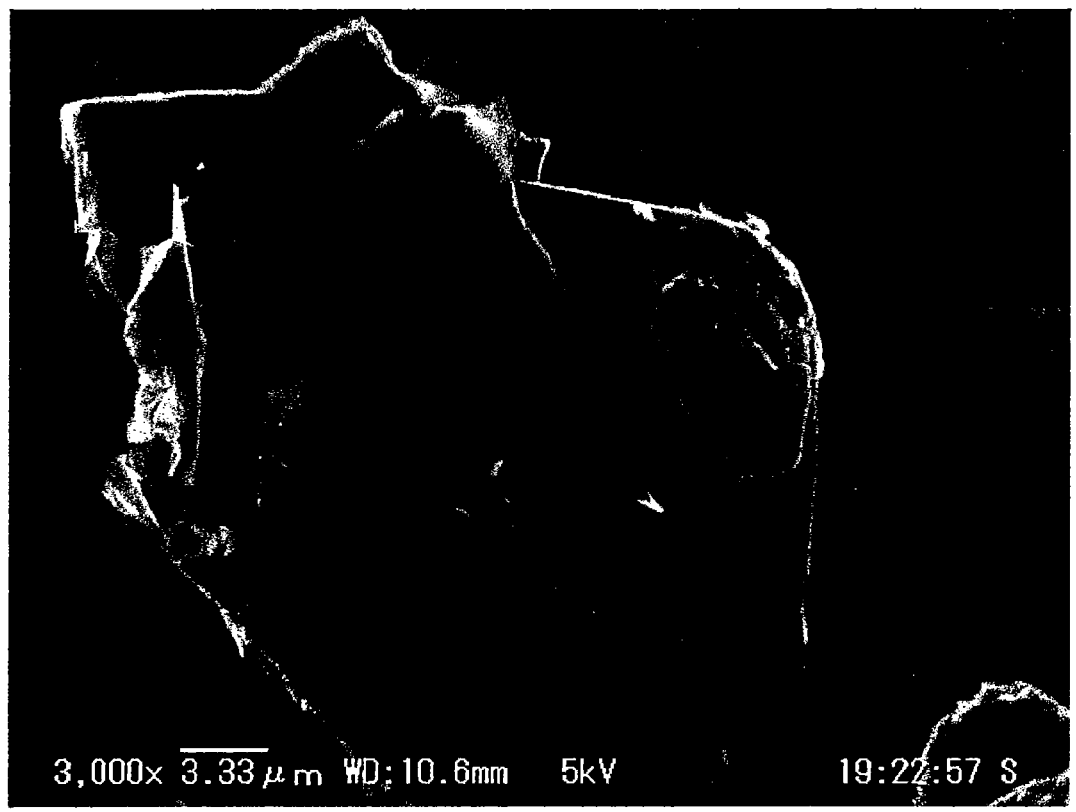
FIG. 6 is an electron photomicrograph of the carbon material for negative electrodes obtained in Comparative Example 7.

A hundred parts by weight of flaky graphite particles having a 002-plane interplanar spacing (d002) and an Lc, determined by wide-angle X-ray diffractometry, of 0.336 nm and 100 nm or larger, respectively, a tap density of 0.43 g/cm$^3$, a Raman R value, which is the ratio of the intensity of a peak around 1,360 cm$^{-1}$ to the intensity of a peak around 1,580 cm$^{-1}$ in the argon ion laser Raman spectrum, of 0.09, an average particle diameter of 23.9 µm, a true density of 2.26 g/cm$^3$, and an aspect ratio of 17 were mixed with 33 parts by weight of a petroleum-derived tar by means of a mixer. The resultant mixture was burned by heating to 1,300° C. in a non-oxidizing atmosphere and then cooled to room temperature. Subsequently, the resultant burning product was treated using the apparatus having a rotor including a casing and a plurality of blades disposed inside the casing, in the same manner as in Example 1, except that the rotor was rotated at a peripheral speed of 83 m/sec to thereby mechanically treat the burning product. The results obtained are shown in Table 1. An electron photomicrograph of the carbon material for electrodes obtained in Comparative Example 7 is shown in FIG. 6.

TABLE 1

| Item | Unit | Example 1 | Comparative Example 1 | Example 2 | Comparative Example 2 | Example 3 | Comparative Example 3 |
|---|---|---|---|---|---|---|---|
| Electrode material production conditions | | | | | | | |
| Burning temperature | ° C. | 1300 | 1300 | 1300 | 1300 | 1000 | 1000 |
| Rotor peripheral speed | m/sec | 100 | 48 | 83 | 48 | 83 | 48 |
| Properties of electrode material | | | | | | | |
| d002 | nm | 0.336 | 0.336 | 0.336 | 0.336 | 0.336 | 0.336 |
| Lc | nm | >100 | >100 | >100 | >100 | >100 | >100 |
| Raman R value | | 0.31 | 0.29 | 0.40 | 0.28 | 0.43 | 0.39 |
| Tap density | g/cm$^3$ | 1.02 | 1.17 | 1.11 | 1.15 | 1.09 | 1.14 |
| Average particle diameter | µm | 16.2 | 16.9 | 16.4 | 16.1 | 16.6 | 16.2 |
| BET specific surface area | m$^2$/g | 4.9 | 2.4 | 4.0 | 3.2 | 4.3 | 3.4 |
| Coverage | % | 5 | 5 | 3 | 3 | 3 | 3 |
| O/C | % | 1.9 | 1.2 | 1.9 | 0.8 | 2 | 1.1 |

TABLE 1-continued

| Item | | | | | | | |
|---|---|---|---|---|---|---|---|
| Amount of eliminated CO (TPD-MS) | μmol/g | 6.1 | 1.5 | 2.1 | 1.1 | 3.3 | 1.9 |
| Aspect ratio | | 2.0 | 1.9 | 2.0 | 2.0 | 2.0 | 2.0 |
| Average degree of circularity | | 0.94 | 0.94 | 0.94 | 0.94 | 0.94 | 0.94 |
| True density | g/cm³ | 2.24 | 2.24 | 2.24 | 2.24 | 2.24 | 2.24 |
| Number-based content of fine powder of 3 μm or smaller | % | 55.8 | 12.6 | 29.1 | 7.3 | 16.2 | 4.9 |
| Electrode properties | | | | | | | |
| Electrolytic-solution absorption time | sec | 39 | 65 | 43 | 87 | 74 | 83 |
| Initial battery characteristics | | | | | | | |
| Irreversible capacity | mAh/g | 30 | 27 | 32 | 30 | 32 | 31 |
| Capacity | mAh/g | 362 | 361 | 364 | 363 | 366 | 365 |
| High-rate discharge characteristics | | | | | | | |
| 1-C discharge/0.2-C discharge | % | 95 | 95 | 95 | 95 | 95 | 96 |
| 2-C discharge/0.2-C discharge | % | 88 | 88 | 88 | 88 | 89 | 88 |
| 3-C discharge/0.2-C discharge | % | 66 | 63 | 66 | 62 | 65 | 64 |
| 4-C discharge/0.2-C discharge | % | 44 | 40 | 43 | 38 | 41 | 40 |
| High-rate charge characteristics | | | | | | | |
| 0.5-C charge/0.2 C-CCCV charge | % | 94 | 93 | 94 | 93 | 93 | 93 |
| 1-C charge/0.2 C-CCCV charge | % | 89 | 88 | 89 | 88 | 88 | 87 |
| 2-C charge/0.2 C-CCCV charge | % | 79 | 77 | 79 | 76 | 78 | 77 |
| 3-C charge/0.2 C-CCCV charge | % | 69 | 65 | 68 | 64 | 66 | 66 |
| 4-C charge/0.2 C-CCCV charge | % | 42 | 27 | 40 | 20 | 32 | 32 |
| Cycle characteristics | | | | | | | |
| 500-cycle retention | % | 61 | 41 | 52 | 28 | 59 | 42 |

| Item | Example 4 | Comparative Example 4 | Comparative Example 5 | Comparative Example 6 | Comparative Example 7 |
|---|---|---|---|---|---|
| Electrode material production conditions | | | | | |
| Burning temperature | — | 1300 | 1300 | 1300 | 1300 |
| Rotor peripheral speed | — | — | — | 48 | 83 |
| Properties of electrode material | | | | | |
| d002 | — | 0.336 | 0.336 | 0.336 | 0.336 |
| Lc | — | >100 | >100 | >100 | >100 |
| Raman R value | — | 0.27 | 0.5 | 0.28 | 0.27 |
| Tap density | — | 0.73 | 0.50 | 0.72 | 0.73 |
| Average particle diameter | — | 15 | 8.4 | 25.3 | 25.4 |
| BET specific surface area | — | 8.1 | 81.5 | 5 | 2.8 |
| Coverage | — | 5 | 5 | 5 | 5 |
| O/C | — | 1.6 | 2.2 | 1.9 | 1.2 |
| Amount of eliminated CO (TPD-MS) | — | 16.6 | 153 | 5 | 4 |
| Aspect ratio | — | 5 | 6 | 15 | 15 |
| Average degree of circularity | — | 0.93 | 0.94 | 0.88 | 0.88 |
| True density | — | 2.24 | 2.24 | 2.24 | 2.24 |
| Number-based content of fine powder of 3 μm or smaller | — | 67 | 88 | 33 | 37 |
| Electrode properties | | | | | |
| Electrolytic-solution absorption time | 68 | 388 | not applicable | >420 | >420 |
| Initial battery characteristics | | | | | |
| Irreversible capacity | 29 | 41 | | 30 | 32 |
| Capacity | 364 | 362 | not applicable | 357 | 351 |
| High-rate discharge characteristics | | | | | |
| 1-C discharge/0.2-C discharge | 95 | 96 | | 90 | 90 |
| 2-C discharge/0.2-C discharge | 87 | 76 | | 60 | 55 |
| 3-C discharge/0.2-C discharge | 63 | 49 | | 35 | 17 |
| 4-C discharge/0.2-C discharge | 39 | 35 | | 15 | 13 |
| High-rate charge characteristics | | | | | |
| 0.5-C charge/0.2 C-CCCV charge | 93 | 91 | | 90 | 90 |
| 1-C charge/0.2 C-CCCV charge | 88 | 84 | | 70 | 68 |
| 2-C charge/0.2 C-CCCV charge | 78 | 76 | | 50 | 45 |
| 3-C charge/0.2 C-CCCV charge | 67 | 66 | | 20 | 18 |
| 4-C charge/0.2 C-CCCV charge | 33 | 36 | | 15 | 15 |
| Cycle characteristics | | | | | |
| 500-cycle retention | 38 | 36 | | 30 | 28 |

As shown in Table 1, the nonaqueous-electrolyte secondary batteries in which the carbon materials of the invention for nonaqueous-electrolyte secondary-battery negative electrodes were used as electrodes exhibited excellent high-rate charge/discharge characteristics and high cycle characteristics.

While the invention has been described in detail and with reference to specific embodiments thereof, it will be apparent to one skilled in the art that various changes and modifications can be made therein without departing from the spirit and scope thereof. This application is based on a Japanese patent application filed on Sep. 29, 2010 (Application No. 2010-219365), the entire contents thereof being incorporated herein by reference.

INDUSTRIAL APPLICABILITY

The nonaqueous-electrolyte secondary battery which employs as an electrode the carbon material for nonaqueous-electrolyte secondary-battery negative electrodes of the invention shows excellent properties and combines high-rate charge/discharge characteristics and high cycle characteristics. Furthermore, a reduction in electrolytic-solution absorption time is attained. The step of infiltrating an electrolytic solution into the electrodes packed into a battery can is hence shortened, making it possible to reduce the cost of battery production.

The invention claimed is:

1. A carbon material, wherein:
the carbon material has an aspect ratio of 10 or less; and
an amount of CO eliminated from the carbon material during heating to 1,000° C., as determined with a temperature programmed decomposition mass spectrometer (TPD-MS), is 2-15 µmol/g.

2. The carbon material according to claim 1, wherein the carbon material has a 002-plane interplanar spacing (d002), as determined by wide-angle X-ray diffractometry, of 0.337 nm or less.

3. The carbon material according to claim 1, wherein the carbon material has a specific surface area of 0.5-8 m²/g.

4. The carbon material according to claim 1, wherein the carbon material has an average degree of circularity, as determined with a flow type particle analyzer, of 0.9 or higher.

5. A negative electrode, comprising:
a current collector; and
an active-material layer formed on the current collector;
wherein the active-material layer comprises the carbon material according to claim 1.

6. A lithium ion secondary battery, comprising:
a positive electrode that is capable of occluding and releasing lithium ions;
the negative electrode according to claim 5; and
an electrolyte.

7. A process for producing a carbon material for nonaqueous-electrolyte secondary-battery negative electrodes, which comprises subjecting a raw carbon material to a mechanical treatment, wherein the raw carbon material has a 002-plane interplanar spacing (d002), as determined by wide-angle X-ray diffractometry, of 0.337 nm or less, a tap density of 0.8 g/cm³ or higher and a value of Raman R of 0.2-0.5, in which the value of Raman R is the ratio of the intensity of a peak appearing around 1,360 cm⁻¹ to the intensity of a peak appearing around 1,580 cm⁻¹, in an argon ion laser Raman spectrum that has a value of Raman R;
wherein:
the obtained carbon material for nonaqueous-electrolyte secondary-battery negative electrodes has an aspect ratio of 10 or less; and
an amount of CO eliminated from the obtained carbon material during heating to 1,000° C., as determined with a temperature programmed decomposition mass spectrometer
(TPD-MS), is 2-15 µmol/g.

8. The process for producing a carbon material for nonaqueous-electrolyte secondary-battery negative electrodes according to claim 7, wherein the mechanical treatment is a treatment in which an apparatus that includes a rotor which comprises a casing and a plurality of blades disposed inside the casing is used to treat the raw carbon material at a peripheral speed of the rotor of 50-300 m/sec.

9. The process for producing a carbon material for nonaqueous-electrolyte secondary-battery negative electrodes according to claim 7, wherein the raw carbon material is a multilayered raw carbon material which comprises a graphitic particle and amorphous carbon that covers the surface of the graphitic particle.

10. The carbon material according to claim 1, wherein the aspect ratio is 7 or less.

11. The carbon material according to claim 1, wherein the aspect ratio is 3 or less.

12. The carbon material according to claim 1, wherein the amount of CO eliminated from the carbon material during heating to 1,000° C. is 2.3-15 µmol/g.

13. The carbon material according to claim 1, wherein the amount of CO eliminated from the carbon material during heating to 1,000° C. is 2-10 µmol/g.

14. The carbon material according to claim 1, wherein the amount of CO eliminated from the carbon material during heating to 1,000° C. is 5.1-10 µmol/g.

15. The carbon material according to claim 1, wherein the carbon material has a specific surface area of 3-8 m²/g.

16. The carbon material according to claim 1, wherein the carbon material has a specific surface area of 0.5-6 m²/g.

17. The carbon material according to claim 1, wherein the carbon material has a specific surface area of 3-6 m²/g.

18. The carbon material according to claim 1, wherein the carbon material has an average degree of circularity, as determined with a flow type particle analyzer, of 0.93 or higher.

19. The carbon material according to claim 1, wherein:
the aspect ratio is 5 or less;
the amount of CO eliminated from the carbon material during heating to 1,000° C. is 3.4-15 µmol/g;
the carbon material has a 002-plane interplanar spacing (d002), as determined by wide-angle X-ray diffractometry, of 0.337 nm or less;
the carbon material has a specific surface area of 1.5-7 m²/g; and
the carbon material has an average degree of circularity, as determined with a flow type particle analyzer, of 0.93 or higher.

20. The carbon material according to claim 1, wherein:
the aspect ratio is 3 or less;
the amount of CO eliminated from the carbon material during heating to 1,000° C. is 5.1-10 µmol/g;
the carbon material has a 002-plane interplanar spacing (d002), as determined by wide-angle X-ray diffractometry, of 0.337 nm or less;
the carbon material has a specific surface area of 3-6 m²/g; and
the carbon material has an average degree of circularity, as determined with a flow type particle analyzer, of 0.93 or higher.

* * * * *